(12) United States Patent
Nammoto et al.

(10) Patent No.: US 9,016,742 B2
(45) Date of Patent: Apr. 28, 2015

(54) ROBOT HAND, ROBOT DEVICE AND METHOD OF MANUFACTURING ROBOT HAND

(71) Applicant: Seiko Epson Corporation, Tokyo (JP)

(72) Inventors: Takashi Nammoto, Sendai (JP); Kazuhiro Kosuge, Sendai (JP); Kosuke Hara, Sendai (JP); Kengo Yamaguchi, Sendai (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/036,100

(22) Filed: Sep. 25, 2013

(65) Prior Publication Data

US 2014/0103673 A1    Apr. 17, 2014

(30) Foreign Application Priority Data

Oct. 11, 2012 (JP) ................ 2012-226109

(51) Int. Cl.
| | | |
|---|---|---|
| *B25J 15/10* | (2006.01) | |
| *B25J 15/00* | (2006.01) | |
| *B25J 15/08* | (2006.01) | |
| *B29C 65/70* | (2006.01) | |
| *B25J 13/08* | (2006.01) | |

(52) U.S. Cl.
CPC ............. *B25J 15/0028* (2013.01); *B25J 15/08* (2013.01); *B29C 65/70* (2013.01); *B25J 15/0009* (2013.01); *B25J 13/082* (2013.01); *B25J 15/10* (2013.01); *Y10S 294/907* (2013.01); *Y10S 901/34* (2013.01)

(58) Field of Classification Search
CPC .... B25J 15/0009; B25J 15/0028; B25J 15/10; B25J 13/082
USPC ........ 294/106, 213, 902, 907; 901/32, 33, 34, 901/38, 39, 46; 623/64
See application file for complete search history.

(56) References Cited

U.S. PATENT DOCUMENTS

| | | | | |
|---|---|---|---|---|
| 3,675,962 A * | 7/1972 | Simpson | ................ | 294/99.1 |
| 4,545,723 A * | 10/1985 | Clark | ................ | 414/730 |
| 4,746,894 A * | 5/1988 | Zeldman | ................ | 338/99 |
| 5,062,855 A * | 11/1991 | Rincoe | ................ | 623/24 |
| 5,108,140 A * | 4/1992 | Bartholet | ................ | 294/106 |
| 5,200,679 A * | 4/1993 | Graham | ................ | 318/568.16 |
| 5,373,747 A * | 12/1994 | Ogawa et al. | ................ | 73/862.581 |
| 5,905,430 A * | 5/1999 | Yoshino et al. | ................ | 340/407.1 |
| 6,247,738 B1 * | 6/2001 | Winkel et al. | ................ | 294/111 |
| 7,658,119 B2 * | 2/2010 | Loeb et al. | ................ | 73/862.046 |
| 8,585,111 B2 * | 11/2013 | Nammoto et al. | ................ | 294/106 |
| 8,662,552 B2 * | 3/2014 | Torres-Jara | ................ | 294/111 |
| 2011/0148132 A1 * | 6/2011 | Park et al. | ................ | 294/106 |

FOREIGN PATENT DOCUMENTS

| | | |
|---|---|---|
| JP | 60-25686 | 2/1985 |
| JP | 10-249775 | 9/1998 |

* cited by examiner

*Primary Examiner* — Dean Kramer
(74) *Attorney, Agent, or Firm* — Harness, Dickey & Pierce, P.L.C.

(57) ABSTRACT

A robot hand includes a finger unit that is in contact with an object. The finger unit includes: a first member in which a tip portion and a base portion connected to the tip portion are formed as a single member; and a second member that covers a surface of the first member.

11 Claims, 18 Drawing Sheets

ROBOT HAND, ROBOT DEVICE AND METHOD OF MANUFACTURING ROBOT HAND

BACKGROUND

1. Technical Field

The present invention relates to a robot hand, a robot device and a method of manufacturing the robot hand.

2. Related Art

In the related art, a robot hand has been proposed that is mounted at a tip of an industrial robot arm or the like and holds or releases an object to perform a predetermined operation. More specifically, a multifunctional robot hand has been proposed that holds a tool to perform an operation such as assembly of components and holds minute components to arrange the minute components with accuracy (for example, refer to JP-A-60-25686).

In such a robot hand, for example, a technique relating to a robot hand has been proposed in which an active element such as an adsorbing pad, a passive element such as a pressure sensor, and the like are included in a finger unit to stably hold various objects. Since such an active element and a passive element are operated by an electronic component such as an IC chip, a configuration is used in which the electronic component is mounted on the finger unit.

However, in the above-mentioned technique, the structure of the finger unit is complicated and the number of components is large, and thus, the manufacturing cost is increased, which makes practical application difficult.

SUMMARY

An advantage of some aspects of the invention is to provide a robot hand and a robot device that are capable of being manufactured with a small number of components at low cost, and a method of manufacturing the robot hand.

An aspect of the invention is directed to a robot hand including a finger unit that is in contact with an object, in which the finger unit includes: a first member in which a tip portion and a base portion connected to the tip portion are formed as a single member; and a second member that covers a surface of the first member.

According to this configuration, since the finger unit that is in contact with the object includes the first member in which the tip portion and the base portion connected to the tip portion are formed as the single member and the second member that covers the surface of the first member, it is possible to simplify the structure of the finger unit, and to reduce the number of components of the finger unit. Further, it is possible to perform integral molding with the same material using a technique such as injection molding, for example, and thus, it is possible to reduce the cost. Thus, it is possible to provide a robot hand that is capable of being manufactured with a small number of components at low cost.

In the robot hand of the aspect of the invention, it is preferable that the first member includes a first chamber that accommodates a predetermined functional element relating to a contact operation with the object, and that the first chamber is sealed by the first member and the second member.

For example, in a structure in which components are connected to each other using only a screw or the like, water or the like may be infiltrated through a gap, and the infiltrated water may be in contact with a functional element such as an electronic component to cause malfunction. Thus, it is difficult to perform an operation in an environment having a large amount of moisture. On the other hand, according to this configuration, since the first member includes the first chamber that accommodates the predetermined functional element relating to the contact operation with the object and the first chamber is sealed by the first member and the second member, it is possible to prevent infiltration of water into the first chamber from the outside, and to suppress water from being in contact with the functional element. Thus, it is possible to provide a robot hand that is capable of performing an operation in an environment having a large amount of moisture.

In the robot hand of the aspect of the invention, it is preferable that the functional element is a pressure sensor that detects pressure that acts on the finger unit by contact with the object.

According to this configuration, since the functional element is the pressure sensor that detects pressure that acts on the finger unit by contact with the object, it is possible to detect pressure applied to the finger unit by contact with the object, and to hold the object with high accuracy.

In the robot hand of the aspect of the invention, it is preferable that a through hole through which a wiring connected to the functional element passes is formed in the base portion, and that the through hole is covered with the second member.

According to this configuration, since the through hole through which the wiring connected to the functional element passes is formed in the base portion and the through hole is covered with the second member, it is possible to supply electric power to the functional element from the outside while securing a waterproof characteristic of the finger unit.

In the robot hand of the aspect of the invention, it is preferable that the second member is provided to be elastically deformable, and that a second chamber that communicates with the first chamber is provided between the second member and the first member.

According to this configuration, since the second member is provided to be elastically deformable and the second chamber that communicates with the first chamber is provided between the second member and the first member, it is possible to hold the object while elastically deforming the surface of the finger unit toward the second chamber. Thus, it is possible to stably hold the object.

In the robot hand of the aspect of the invention, it is preferable that the first member has rigidity with respect to at least pressure that acts on the finger unit by contact with the object.

According to this configuration, since the first member has rigidity with respect to at least pressure that acts on the finger unit by contact with the object, the first member forms a frame of the finger unit, to thereby make it possible to maintain the shape of the finger unit.

In the robot hand of the aspect of the invention, it is preferable that the robot hand further includes: a support portion that supports a connection portion that connects the tip portion and the base portion of the finger unit so that the finger unit is rotatable in a predetermined direction; and an elastic portion that connects the support portion and the base portion and gives an elastic force to the finger unit in a predetermined direction.

According to this configuration, since the robot hand further includes the support portion that supports the connection portion that connects the tip portion and the base portion of the finger unit so that the finger unit is rotatable in the predetermined direction and the elastic portion that connects the support portion and the base portion and gives the elastic force to the finger unit in the predetermined direction, it is possible to gently and elastically deform the finger unit with respect to pressure applied to the finger unit in the predetermined direction.

In the robot hand of the aspect of the invention, it is preferable that the plural finger units are provided, and that the plural finger units are capable of holding the object.

According to this configuration, since the plural finger units are provided and the plural finger units are capable of holding the object, it is possible to achieve a robot hand that is capable of performing various operations such as contact with the object and holding of object.

Another aspect of the invention is directed to a robot device including: a robot hand including a finger unit that is in contact with an object, the finger unit including a first member in which a tip portion and a base portion connected to the tip portion are formed as a single member and a second member that covers a surface of the first member; and a multi-axial arm that supports the robot hand.

According to this configuration, since the finger unit that is in contact with the object, in the robot hand, includes the first member in which the tip portion and the base portion connected to the tip portion are formed as the single member and the second member that covers the surface of the first member, it is possible to simplify the structure of the finger unit, and to reduce the number of components of the finger unit. Further, it is possible to perform integral molding with the same material using a technique such as injection molding, for example, and thus, it is possible to reduce the cost. Thus, it is possible to provide a robot device that is capable of being manufactured with a small number of components at low cost.

In the robot device of the aspect of the invention, it is preferable that the plural multi-axial arms be provided.

According to this configuration, since the robot hand is provided to each of two arms, it is possible to perform an operation in a state where an object is held by both arms. Thus, it is possible to realize a holding state that is barely achieved in the related art, and to realize various holding states.

Still another aspect of the invention is directed to a robot device including: a robot hand including a finger unit that is in contact with an object, the finger unit including a first member in which a tip portion and a base portion connected to the tip portion are formed as a single member and a second member that covers a surface of the first member; and a plurality of multi-axial arms that support the robot hand.

According to this configuration, since the finger unit that is in contact with the object, in the robot hand, includes the first member in which the tip portion and the base portion connected to the tip portion are formed as the single member and the second member that covers the surface of the first member, it is possible to simplify the structure of the finger unit, and to reduce the number of components of the finger unit. Further, it is possible to perform integral molding with the same material using a technique such as injection molding, for example, and thus, it is possible to reduce the cost. Thus, it is possible to provide a robot device that is capable of being manufactured with a small number of components at low cost. Further, since the robot hand is provided to each of two arms, it is possible to perform an operation in a state where an object is held by both arms. Thus, it is possible to realize a holding state that is barely achieved in the related art, and to realize various holding states.

Yet another aspect of the invention is directed to a method of manufacturing a robot hand, including: molding a surface member that is provided on a surface of a finger unit that is in contact with an object; and arranging a first member inside the surface member so that the first member is covered with the molded surface member and a tip portion of the first member and a base portion thereof connected to the tip portion are formed as a single member.

According to this configuration, since the surface member that is provided on the surface of the finger unit that is in contact with the object is molded, and then, inside a molded second member, the first member is arranged inside the surface member so that the first member is covered with the molded surface member and the tip portion of the first member and the base portion thereof connected to the tip portion are formed as the single member, it is possible to efficiently manufacture a finger unit having a small number of components. Thus, it is possible to manufacture a robot hand having a small number of components at low cost.

In the method of the aspect of the invention, it is preferable that the method further include: retaining a predetermined functional element relating to a holding operation of the object in the first member after the first member is arranged inside the surface member; and sealing the first member after the functional element is retained.

According to this configuration, since the predetermined functional element relating to the holding operation of the object is retained in the first member after the first member is arranged inside a second member and before the first member is sealed, it is also possible to seal the functional element when the second member is arranged. For example, in a structure in which components are connected to each other using only a screw or the like, water or the like may be infiltrated through a gap, and the infiltrated water may be in contact with a functional element to cause malfunction. Thus, it is difficult to perform an operation in an environment having a large amount of moisture. On the other hand, according to this configuration, it is possible to easily manufacture a configuration in which the functional element is disposed in a space sealed by the second member, and thus, it is possible to manufacture a robot hand that is capable of performing an operation in an environment having a large amount of moisture at low cost.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
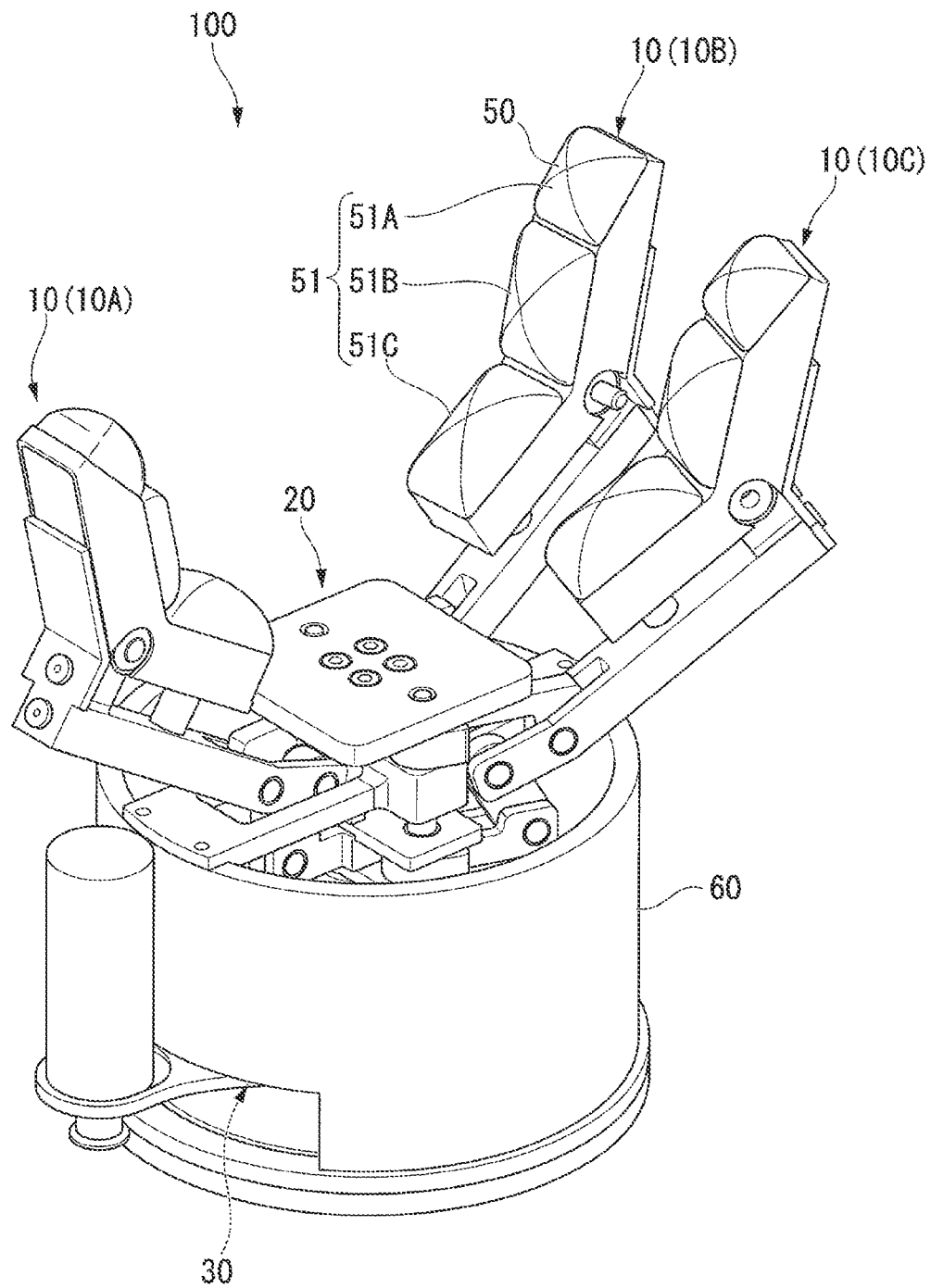
FIG. 1 is a perspective view illustrating an entire configuration of a robot hand according to a first embodiment of the invention.

Hereinafter, a robot hand and a robot device according to exemplary embodiments of the invention will be described referring to the accompanying drawings. In the drawings, the scale, number, and the like of each structure are different from those of the real structure to help with understanding of respective configurations.

First Embodiment

Figure 2:
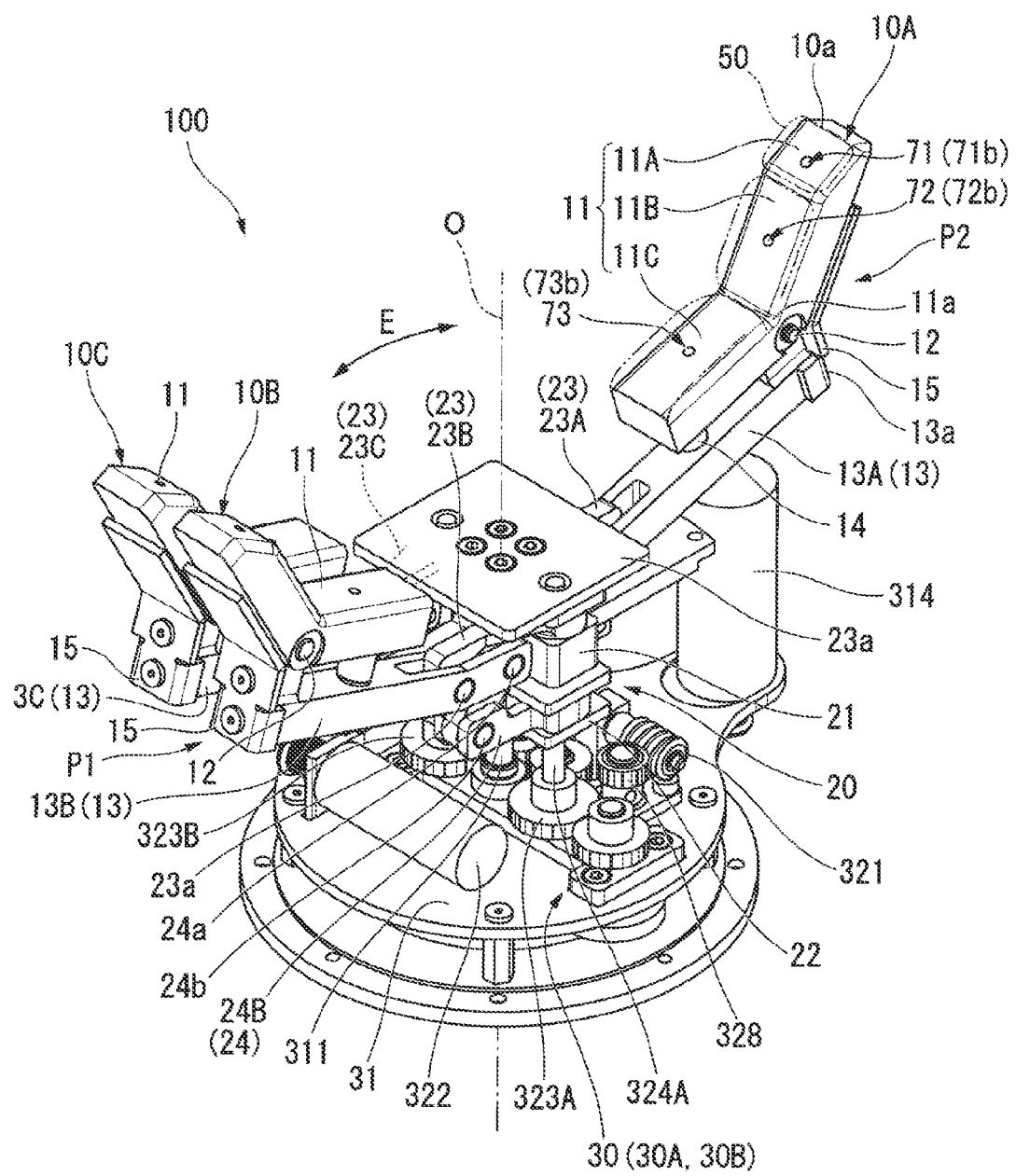
FIG. 2 is a perspective view illustrating a configuration of a part of the robot hand according to the first embodiment.
Figure 3:
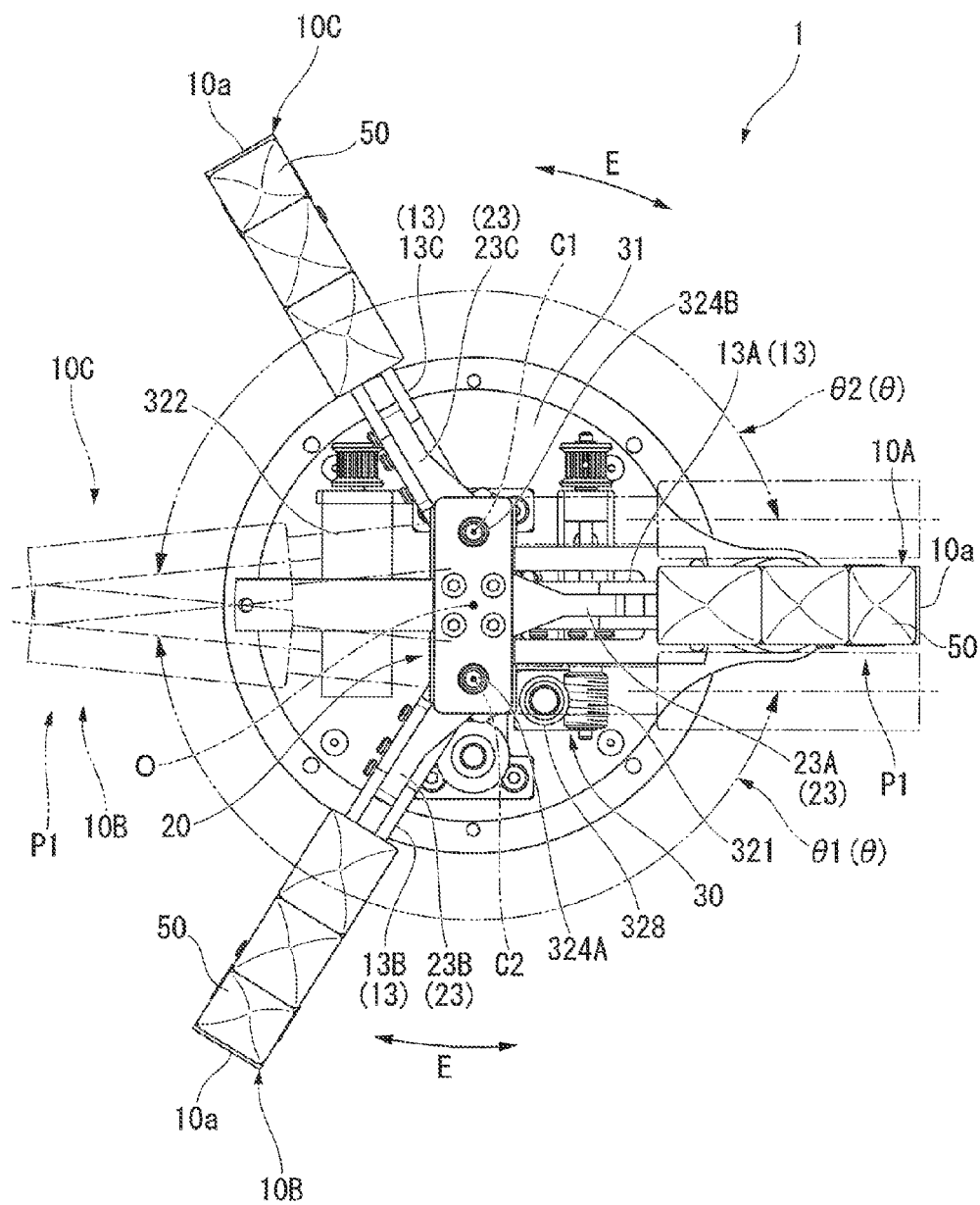
FIG. 3 is a plan view illustrating a configuration of a part of the robot hand according to the first embodiment.

FIG. 1 is a perspective view illustrating an entire configuration of a robot hand 100. FIG. 2 is a perspective view illustrating a configuration of a part of the robot hand 100. FIG. 3 is a plan view illustrating the robot hand 100 shown in FIG. 2.

As shown in FIGS. 1 to 3, the robot hand 100 according to the present embodiment includes three finger units 10 (first finger unit 10A, second finger unit 10B and third finger unit 10C), a support section 20 that supports the finger units 10, and a drive section 30 that drives the support section 20. The robot hand 100 is used as a holding device of an industrial robot that holds an object such as a tool or a component, for example. The robot hand 100 may be used for other purposes (outer space field, medical field, food field, play equipment field or the like), as well as for the industrial robot.

Further, in the present embodiment, each of three finger units 10 to be described later is covered with a sealing member 50 so that the inside thereof is sealed. Accordingly, the robot hand 100 may be used even in the case of holding an object in a place having a large amount of moisture, for example, inside a cleaner such as a dishwasher, inside a water tank, or the like. In FIG. 2, the sealing members 50 (to be described later) that covers the finger units 10, the support section 20 and a cover member 60 that covers and the drive section 30 are not shown, and the insides of the finger units 10 and an internal structure of the support section 20 or the drive section 30 are shown to be distinguishable (the sealing member 50 is shown with a two-dotted line with respect to only the finger unit 10A).

Here, an axis that is orthogonal to a common plane (support plate to be described later) where base end portions of three finger units 10A, 10B and 10C are positioned is referred to as a hand axis O, which forms a rotation central axis line of the finger unit 10A. The finger units 10A, 10B and 10C, the support section 20 and the drive section 30 are arranged in this order along the hand axis O.

Further, the tip side of the finger units 10A, 10B and 10C is referred to as an upside, and the side of the drive section 30 is referred to as a downside, along the direction of the hand axis O. Further, a direction that is orthogonal to the hand axis O is referred to as a radial direction. Further, a direction that turns around the hand axis O is referred to as a circumferential direction (arrow E direction in FIG. 3). In the present embodiment, turning around the vicinity of the hand axis O is also collectively referred to as "turning". For example, turning centers of the second finger unit 10B and the third finger unit 10C shift from the hand axis O, but this case is also referred to as turning.

Three finger units 10A, 10B and 10C are respectively provided to be able to perform an opening and closing operation by an opening and closing mechanism 30A of the drive section 30. The positions of respective finger tips 10a in a fully opened state and in a fully closed state according to the opening and closing operation are concentric around the hand axis O when seen from a planar view in FIG. 3. Strictly speaking, since the respective rotation centers of the finger units 10A, 10B and 10C are different from each other, the above-mentioned positions are not concentric around the hand axis O. However, in the present embodiment, it is assumed that the positions are concentric. Further, the first finger unit 10A among three finger units 10A, 10B and 10C is fixed and does not move in the circumferential direction E, and the second finger unit 10B and the third finger unit 10C are provided to be able to move in the circumferential direction E by a turning movement section 30B of the drive section 30.

Each turning range of the second finger unit 10B and the third finger unit 10C covers a range of 180° or greater (a range of θ shown in FIG. 3) from a first finger position P1 that is opposite to the first finger unit 10A to a second finger position P2 that is close to the first finger unit 10A. Here, the expression "opposite" includes both of a strictly opposite state and an approximately opposite state.

That is, a turning range θ1 (θ) of the second finger unit 10B is a range where the second finger unit 10B turns along a plane that intersects with a plane, in which base end portions of three finger units 10A, 10B and 10C (root portions on an opposite side to the tips of the finger units) are disposed, including the central line of the second finger unit 10B (line along a longitudinal direction of the second finger unit 10B). On the other hand, a turning range θ2 (θ) of the third finger unit 10C is a range where the third finger unit 10C turns along a plane that intersects with a plane, in which the base end portions of three finger units 10A, 10B and 10C are disposed, including the central line of the third finger unit 10C (line along a longitudinal direction of the third finger unit 10C). In FIG. 3, the second finger unit 10B and the third finger unit 10C that move in the turning ranges θ1 and θ2 are shown with two-dotted lines, which respectively cover a range of 180° or greater.

Figure 4:
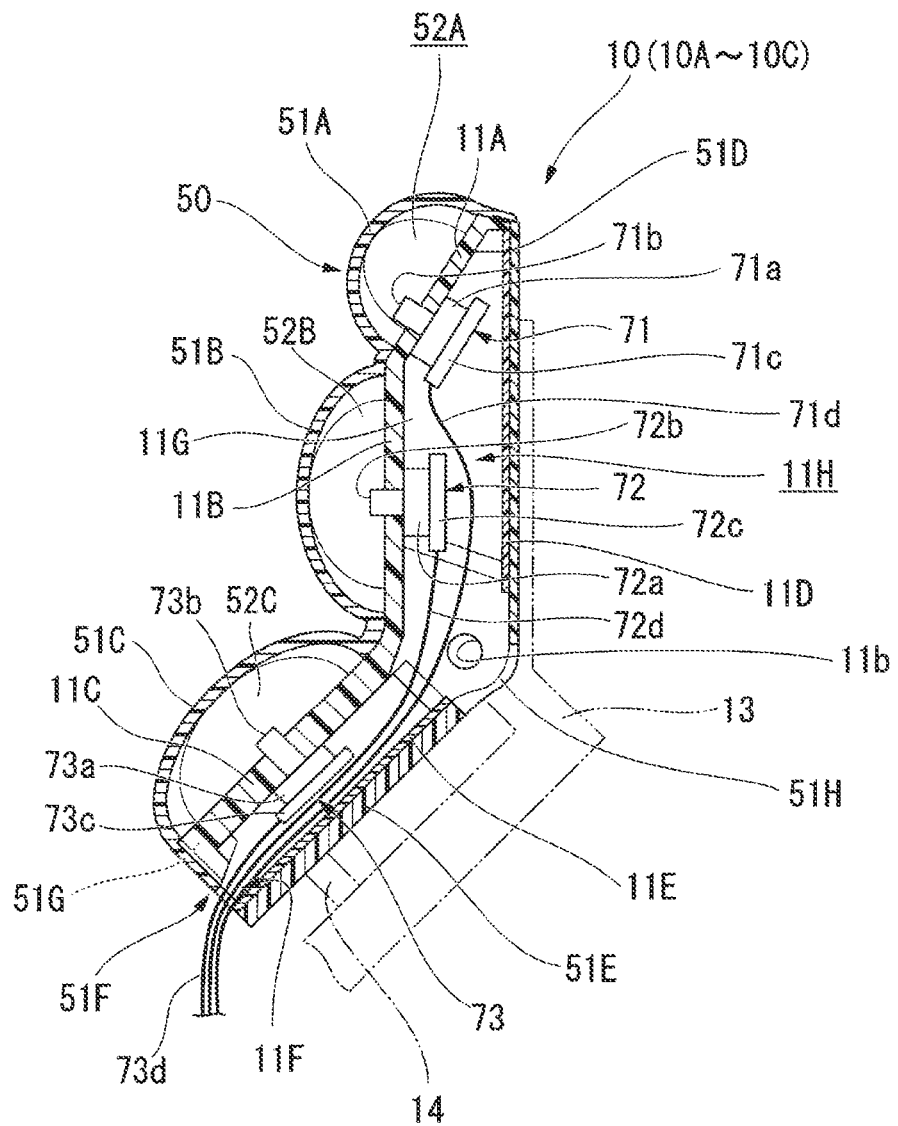
FIG. 4 is a cross-sectional view illustrating a configuration of a part of a finger unit of the robot hand according to the first embodiment.

FIG. 4 is a cross-sectional view illustrating a configuration of the finger units 10 (10A, 10B and 10C).

As shown in FIGS. 2 and 4, each of the finger units 10A, 10B and 10C includes a rigid member 11 that forms a frame, a joint section 12, the sealing member 50 that covers the rigid member 11, and an elastic member 14 that is disposed between the rigid member 11 that is covered with the sealing member 50 and a support member 13.

The rigid member 11 is bent in a direction in which the finger units 10A, 10B and 10C are closed. The rigid member 11 is formed in an approximately L shape to have a bending portion 11a. A through hole 11b is formed in the bending portion 11a. The shaft-shaped joint section 12 that is fixed to the support member 13 at opposite ends thereof is inserted into the through hole. Thus, the finger units 10A, 10B and 10C are rotatable around the joint section 12. Alternatively, a configuration may be used in which a through hole is formed in a portion of the support member 13 that overlaps with the bending portion 11a and the opposite end portions of the shaft-shaped joint section 12 that is fixed to the bending portion 11a of the rigid member 11 at a central portion thereof is inserted into the through hole. In this case, the rigid member 11 is similarly rotatable around the joint section 12.

The rigid member 11 includes a tip portion 11A, a first ball portion 11B, a second ball portion 11C, a first back portion 11D, a second back portion 11E, a base end portion 11F, and side portions 11G. The rigid member 11 is formed of a resin material having a high hardness such as an epoxy resin so that the tip portion 11A, the first ball portion 11B, the second ball portion 11C, the first back portion 11D, the second back portion 11E, and the base end portion 11F are integrally formed.

The tip portion 11A is positioned in a nail portion of the rigid member 11. The first ball portion 11B is provided between the bending portion 11a of the rigid member 11 and the tip portion 11A, and is provided integrally with the tip portion 11A. The second ball portion 11C is provided between the bending portion 11a of the rigid member 11 and an end portion thereof opposite to the side of the tip portion 11A (the base end side of the finger unit with respect to the bending portion 11a).

The first back portion 11D and the second back portion 11E are disposed on the backside of the finger units 10A, 10B and 10C. The first back portion 11D is disposed in a region corresponding to the tip portion 11A and the first ball portion 11B. The second back portion 11E is disposed in a region corresponding to the second ball portion 11C. The base end portion 11F is disposed on the side of the support section 20 in the finger units 10A, 10B and 10C. The side portions 11G are disposed on the opposite sides of the finger units 10A, 10B and 10C so that the tip portion 11A, the first ball portion 11B, the second ball portion 11C, the first back portion 11D, the second back portion 11E and the base end portion 11F are interposed therebetween. The through hole 11b is formed in the side portions 11G.

A hollow chamber portion (first chamber) 11H that is surrounded by the first ball portion 11B, the second ball portion 11C, the first back portion 11D, the second back portion 11E, the base end portion 11F and the side portions 11G is formed in the rigid member 11. At least a part of the chamber portion 11H on the side of the tip portion 11A and the first ball portion 11B is sealed. A first pressure sensor 71, a second pressure sensor 72 and a third pressure sensor 73 are disposed in the chamber portion 11H. For example, a semiconductor pressure sensor or the like may be used as the first pressure sensor 71, the second pressure sensor 72 and the third pressure sensor 73. As the first pressure sensor 71, the second pressure sensor 72 and the third pressure sensor 73 are provided, it is possible to detect a force applied to the finger units 10A, 10B and 10C, and to control a force applied to an object with high accuracy. Here, at least one of the first pressure sensor 71, the second pressure sensor 72 and the third pressure sensor 73 may be omitted.

The first pressure sensor 71 is provided in the tip portion 11A. The first pressure sensor 71 includes a main body portion 71a, a pressure sensing portion 71b, and a circuit board 71c. The main body portion 71a is attached to an inner surface side of the tip portion 11A (front surface of the chamber portion 11H side). The pressure sensing portion 71b is provided to pass through the tip portion 11A and is disposed to protrude from an outer surface of the tip portion 11A. The circuit board 71c is connected to a wiring 71d and is capable of transmitting and receiving an electric signal through the wiring 71d. The wiring 71d is extended to the outside through a through hole 11c formed on the base end side of the rigid member 11.

The second pressure sensor 72 is provided in the first ball portion 11B. The second pressure sensor 72 includes a main body portion 72a, a pressure sensing portion 72b, and a circuit board 72c. The main body portion 72a is attached to an inner surface side of the first ball portion 11B (front surface of the chamber portion 11H side). The pressure sensing portion 72b is provided to pass through the first ball portion 11B and is disposed to protrude from an outer surface of the first ball portion 11B. The circuit board 72c is connected to a wiring 72d and is capable of transmitting and receiving an electric signal through the wiring 72d. The wiring 72d is extended to the outside through a through hole 11c formed on the base end side of the rigid member 11, in a similar way to the wiring 71d of the first pressure sensor 71.

The third pressure sensor 73 is provided in the second ball portion 11C. The third pressure sensor 73 includes a main body portion 73a, a pressure sensing portion 73b, and a circuit board 73c. The main body portion 73a is attached to an inner surface side of the second ball portion 11C (front surface of the chamber portion 11H side). The pressure sensing portion 73b is provided to pass through the second ball portion 11C and is disposed to protrude from an outer surface of the second ball portion 11C. The circuit board 73c is connected to a wiring 73d and is capable of transmitting and receiving an electric signal through the wiring 73d. The wiring 73d is extended to the outside through a through hole 11c formed on the base end side of the rigid member 11.

The sealing member 50 is disposed to cover the tip portion 11A, the first ball portion 11B, the second ball portion 11C, the first back portion 11D, the second back portion 11E, the base end portion 11F and the side portions 11G of the rigid member 11. The chamber portion 11H of the rigid member 11 forms an airtight space sealed by the sealing member 50. The sealing member 50 is formed of a material that is deformable in holding an object, such as a flexible resin.

The sealing member 50 includes a tip portion 51A, a first ball portion 51B, a second ball portion 51C, a first back portion 51D, a second back portion 51E, a base end portion 51F, side portions 51G, and a connection portion 51H.

The tip portion 51A covers the tip portion 11A of the rigid member 11. The tip portion 51A has a shape that is curved to protrude toward a front surface side of the tip portion 11A. A chamber portion (second chamber) 52A is formed between the tip portion 51A and the tip portion 11A. The tip portion 51A is provided to be deformable toward the chamber portion 52A due to external pressure in holding an object, for example. In a case where inner pressure of the chamber portion 52A is changed due to deformation of the tip portion 51A, the inner pressure change may be detected by the first pressure sensor 71, for example.

The first ball portion 51B covers the first ball portion 11B of the rigid member 11. The first ball portion 51B has a shape that is curved to protrude toward a front surface side of the first ball portion 11B. A chamber portion (second chamber) 52B is formed between the first ball portion 51B and the first ball portion 11B. The first ball portion 51B is provided to be deformable toward the chamber portion 52B due to external pressure in holding an object, for example. In a case where inner pressure of the chamber portion 52B is changed due to deformation of the first ball portion 51B, the inner pressure change may be detected by the second pressure sensor 72, for example.

The second ball portion 51C covers the second ball portion 11C of the rigid member 11. The second ball portion 51C has a shape that is curved to protrude toward a front surface side of the second ball portion 11C. A chamber portion (second chamber) 52C is formed between the second ball portion 51C and the second ball portion 11C. The second ball portion 51C is provided to be deformable toward the chamber portion 52C due to external pressure in holding an object, for example. In a case where inner pressure of the chamber portion 52C is changed due to deformation of the second ball portion 51C, the inner pressure change may be detected by the third pressure sensor 73, for example.

The first back portion 51D, the second back portion 51E and the side portions 51G respectively cover the first back portion 11D, the second back portion 11E and the side portions 11G of the rigid member 11. The first back portion 51D, the second back portion 51E and the side portions 51G are respectively in close contact with the first back portion 11D, the second back portion 11E and the side portions 11G. The connection portion 51H connects the first back portion 51D and the second back portion 51E.

The base end portion 51F covers the base end portion 11F of the rigid member 11. The base end portion 51F is in close contact with a front surface of the base end portion 11F. The base end portion 51F is provided to seal the wirings 71d, 72d and 73d that are disposed to pass through the through holes 11c of the base end portion 11F, for each through hole 11c. Thus, the chamber portion 11H of the rigid member 11 is sealed by the wirings 71d, 72d and 73d and the base end portion 51F of the sealing member 50, in the through holes 11c.

Here, a stopper 15 that regulates rotation of the rigid member 11 is provided in the finger units 10A, 10B and 10C. The stopper 15 protrudes along an upper end surface of the support member 13 from a base end of the opposite surface to the first ball portion 11B (surface on the opening side in the opening and closing direction of the finger unit) for example. For example, the stopper 15 has a function of regulating a rotational angle (rotational angle in a case where the rigid member 11 rotates around the joint section 12) so that the rigid member 11 does not rotate with reference to the joint section 12 at a predetermined angle or greater. For example, in a case where the elastic member 14 has a natural length, the stopper 15 maintains a state of being in contact with the upper end surface 13a of the support member 13.

The support section 20 includes the support member 13 that supports the finger units 10A, 10B and 10C to be rotatable, an upper connection base plate 21, a lower connection base plate 22, fixed links 23 that connect and support a first support member 13A of the first finger unit 10A and transmit rotational power from the turning movement section 30B to a second support member 13B of the second finger unit 10B and a third support member 13C of the third finger unit 10C, and connection links 24 that support the first support member 13A of the first finger unit 10A to be able to be opened and closed and support the second support member 13B of the second finger unit 10B and the third support member 13C of the third finger unit 10C to be rotatable and to be able to be opened and closed.

The finger units 10A, 10B and 10C are connected to the support member 13 through the elastic member 14. For example, a compression spring may be used as the elastic member 14. The elastic member 14 is provided at a position of the support member 13 on the base end side of each of the finger units 10A, 10B and 10C with reference to the joint section 12. One end of the elastic member 14 is connected to each of the finger units 10A, 10B and 10C, and the other end of the elastic member 14 is connected to the support member 13. Thus, the finger units 10A, 10B and 10C are provided to be rotatable (be able to be opened and closed) around the joint section 12 in a direction of being in contact with an object.

Each of the support members 13A, 13B and 13C of the finger units 10A, 10B and 10C supports the rigid member 11 to be rotatable at the bending portion 11a through the joint section 12, and is supported to be rotatable (be able to be opened and closed) by a joint section 23a of the fixed link 23 in a direction of being in contact with an object. Further, the support members 13A, 13B and 13C are connected to a first joint section 24a of the connection link 24 on the base end side with reference to the joint section 23a. The position of the first joint section 24a varies according to an up-down movement of the connection link 24, and thus, the support member 13 is rotatable around the first joint section 24a.

The fixed links 23 are rigid members that connect the drive section 30 and the respective support members 13 of the finger units 10A, 10B and 10C. Specifically, the fixed links 23 include a first fixed link 23A that is provided to the first finger unit 10A, and a second fixed link 23B and a third fixed link 23C that are respectively provided to the second finger unit 10B and the third finger unit 10C.

The fixed links 23A, 23B and 23C support the support member 13 to be rotatable through the joint section 23a. For example, a configuration may be used in which a through hole (not shown) is formed in a portion of the fixed link 23 that overlaps with the support member 13 and the shaft-shaped joint section 23a that is fixed to the support member 13 at opposite ends thereof is inserted into the through hole. Thus, the support member 13 is rotatable around the joint section 23a. Alternatively, a configuration may be used in which a through hole is formed in a portion of the support member 13 that overlaps with the fixed link 23 and the opposite end portions of the shaft-shaped joint section 23a that is fixed to the fixed link 23 at a central portion thereof are inserted into the through hole. In this case, the support member 13 is similarly rotatable around the joint section 23a.

A base end of the first fixed link 23A is fixed to the upper connection base plate 21. Base ends of the second fixed link 23B and the third fixed link 23C are respectively pivotally supported by finger rotation shafts 324A and 324B (to be described later) of the drive section 30.

Figure 5:
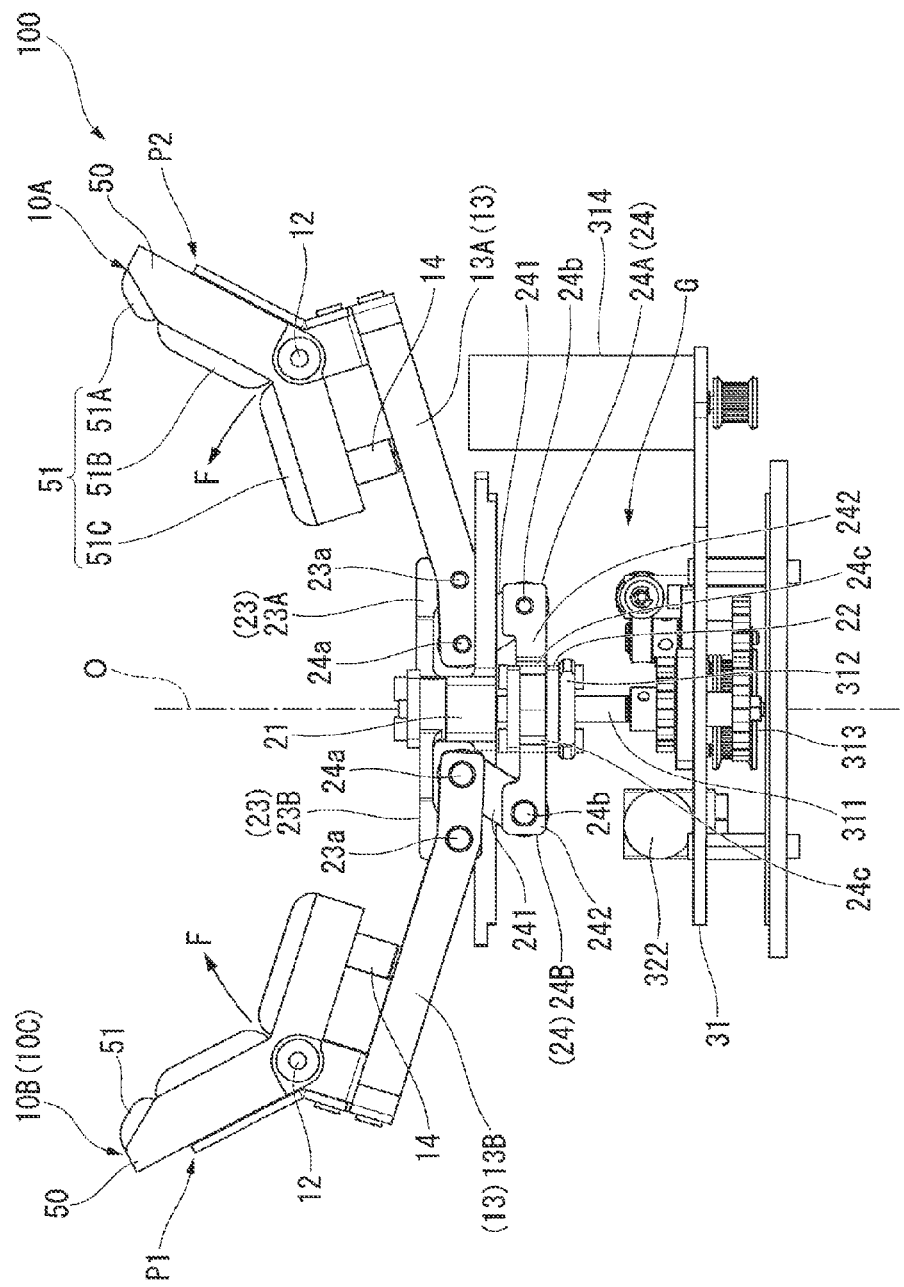
FIG. 5 is a side view illustrating a configuration of a part of the robot hand according to the first embodiment.

As shown in FIGS. 4 and 5, the connection link 24 is configured so that a connection plate 241 and a connection member 242 are provided to be rotatable around the second joint section 24b and the connection plate 241 and the base end of the support member 13 are rotatable around the first joint section 24a. Further, a base end 24c of the connection member 242 that is disposed on an opposite side to the joint section 24b is supported on the lower connection base plate 22. The connection links 24 include a first connection link 24A that is provided to the first finger unit 10A, and a second connection link 24B and a third connection link 24C that are respectively provided to the second finger unit 10B and the third finger unit 10C.

The first connection link 24A is fixed to a ball nut 312 (to be described later) of the drive section 30 at a portion thereof on a side that is opposite to the side where the joint section 24b of the connection member 242 is provided.

The second connection link 24B and the third connection link 24C are pivotally supported by the finger rotation shafts 324A and 324B of the drive section 30 that are inserted into the lower connection base plate 22, and are provided to be rotatable around the rotation shafts.

As shown in FIGS. 1 and 2, the drive section 30 includes the opening and closing mechanism 30A that synchronously opens and closes three finger units 10A, 10B and 10C, and the turning movement section 30B that simultaneously turns the second finger unit 10B and the third finger unit 10C in the circumferential direction. Main components of the opening and closing mechanism 30A and the turning movement section 30B are arranged on a drive base plate 31 having a planar surface in a direction that is orthogonal to the hand axis O under the lower connection base plate 22.

The drive section 30 is accommodated in a cylindrical cover body (not shown), for example.

Figure 6:
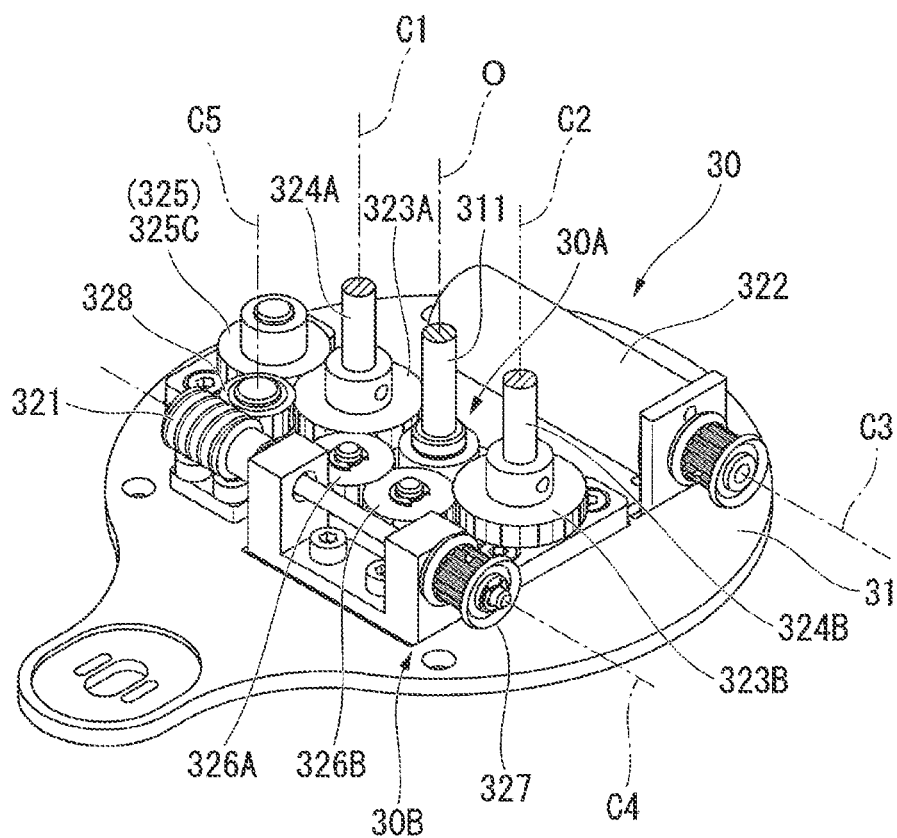
FIG. 6 is a perspective view illustrating en entire configuration of a rotation mechanism of the robot hand according to the first embodiment.
Figure 7:
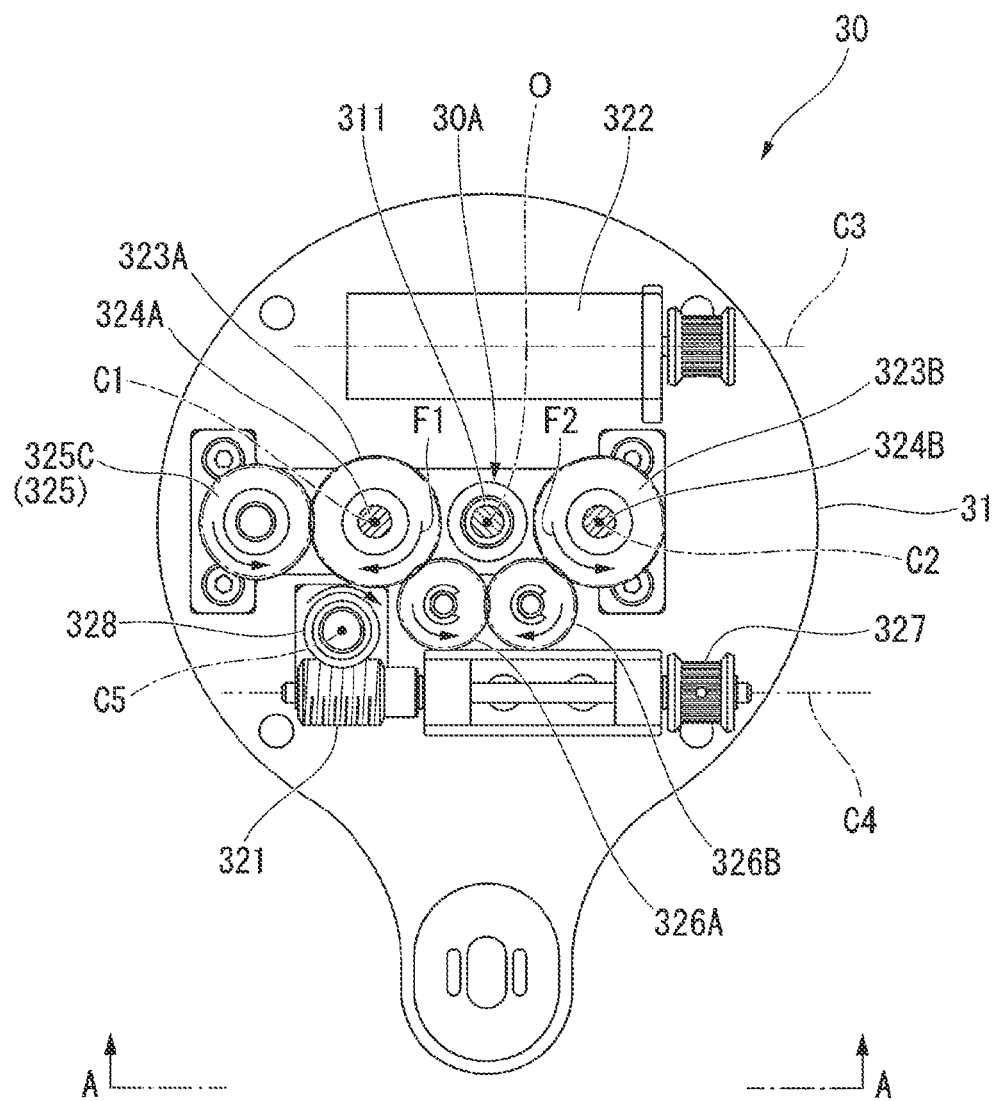
FIG. 7 is a plan view illustrating a configuration of the rotation mechanism of the robot hand according to the first embodiment.
Figure 8:
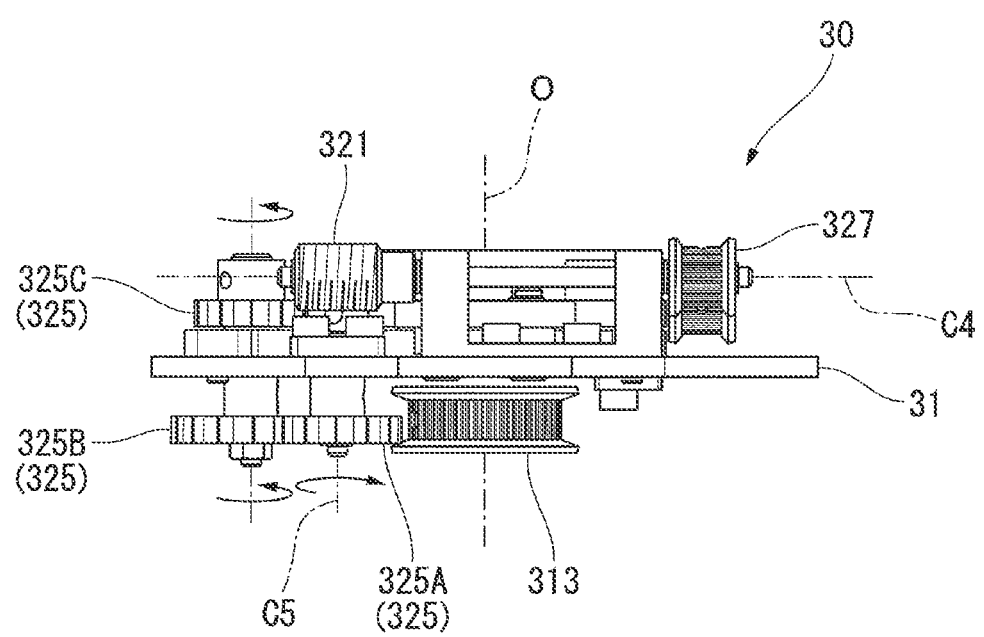
FIG. 8 is a side view illustrating a configuration of the rotation mechanism of the robot hand according to the first embodiment.
Figure 9:
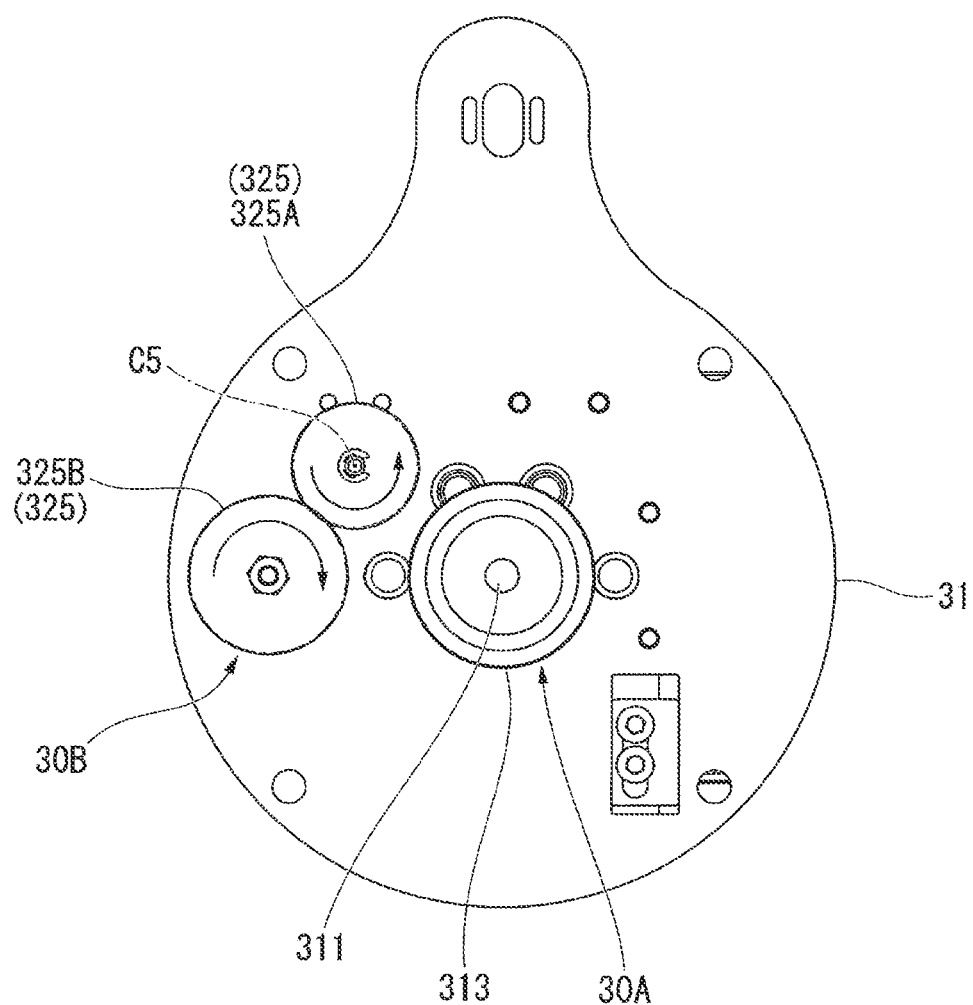
FIG. 9 is a plan view illustrating a configuration of the rotation mechanism of the robot hand according to the first embodiment.

As shown in FIGS. 2 and 5, the opening and closing mechanism 30A includes a screw shaft 311 (see FIG. 6) of a ball screw that is supported to be rotatable around the hand axis O with respect to the drive base plate 31, the ball nut 312 that is screw-coupled with the screw shaft 311 and moves up and down along the screw shaft 311, a pulley 313 (see FIGS. 4, 5 and 8) that is coaxially provided at a lower end of the screw shaft 311 passed through the drive base plate 31, and a first drive motor 314 that transmits rotation to the pulley 313 through a belt or the like. The ball nut 312 is provided integrally with the lower connection base plate 22.

That is, as shown in FIG. 5, if the rotation is transmitted to the pulley 313 from the first drive motor 314, the screw shaft 311 rotates together with the pulley 313, and thus, the lower connection base plate 22 that is provided integrally with the ball nut 312 moves up and down. Then, if the connection member 242 of the fixed link 24 of which the base end is provided to the lower connection base plate 22 moves up and down, the position of the joint section 24a of the connection plate 241 varies in the radial direction, and thus, the support member 13 of the finger units 10A, 10B and 10C rotates around the joint section 24a to perform the opening and closing operation.

As shown in FIGS. 6 to 9, the turning movement section 30B has a schematic configuration that includes a worm gear 321, a second drive motor 322 that rotates the worm gear 321, a pair of rotation shaft spur gears 323 (323A and 323B) of the same shape that rotates in different directions around rotation axes C1 and C2 that are parallel to the hand axis O in association with the rotation of the worm gear 321 to turn the second finger unit 10B and the third finger unit 10C shown in FIG. 3, the finger rotation shafts 324A and 324B that extend upward with respect to the respective rotation shaft spur gears 323A and 323B, and a transmission spur gear 325 that transmits rotational power to the pair of rotation shaft spur gears 323A and 323B from the worm gear 321.

The worm gear 321 has a cylindrical shape, and has spiral teeth on a curved surface portion of a side surface thereof.

Here, a part of the turning movement section 30B excluding the finger rotation shafts 324A and 324B is referred to as a "power section G" shown in FIGS. 4 and 5. The power section G is disposed under the support section 20.

The second finger unit 10B is provided to the first rotation shaft spur gear 323A that is one of the pair of rotation shaft spur gears 323 through the finger rotation shaft 324A, the upper connection base plate 21, the lower connection base plate 22, the second fixed link 23B and the second connection link 24B; and the third finger unit 10C is provided to the second rotation shaft spur gear 323B that is the other one of the pair and rotates in a different direction from the first rotation shaft spur gear 323A through the finger rotation shaft 324B, the upper connection base plate 21, the lower connection base plate 22, the third fixed link 23C and the third connection link 24C. As the second drive motor 322 rotates, the second finger unit 10B and the third finger unit 10C rotate in a direction of being close to or distant from each other in the circumferential direction. That is, the second finger unit 10B and the third finger unit 10C are able to turn between the first finger position P1 and the second finger position P2 as described above.

The second drive motor 322 and the worm gear 321 are respectively disposed on the drive base plate 31, in which respective rotation axes C3 and C4 thereof are horizontally provided in parallel. A pulley 327 is coaxially provided to the worm gear 321 on the rotation axis C4. Rotation of the second drive motor 322 is transmitted to the pulley 327.

Further, a worm wheel 328 that is engaged with the worm gear 321 and rotates around a vertical axis (rotation axis C5) that is orthogonal to the rotation axis C4 is provided on the drive base plate 31. A first transmission spur gear 325A that is disposed under the drive base plate 31 is coaxially provided at a lower end of the rotation axis C5 of the worm wheel 328. Further, a second transmission spur gear 325B is provided to be engaged with the first transmission spur gear 325A to rotate in a different direction from the first transmission spur gear 325A, and a third transmission spur gear 325C is provided coaxially with the second transmission spur gear 325B on the drive base plate 31. The first rotation shaft spur gear 323A is engaged with the third transmission spur gear 325C to rotate in a different direction from the third transmission spur gear 325C.

The worm wheel 328 has a disc shape, and has arc-shaped teeth on a curved surface portion of a side surface thereof.

The first rotation shaft spur gear 323A and the second rotation shaft spur gear 323B respectively have a tooth shape of the same pitch, and are supported to be rotatable by the drive base plate 31 with an interval therebetween being constantly maintained. The rotation axes C1 and C2 thereof are arranged at symmetrical positions with the screw shaft 311 of the ball screw being interposed therebetween.

A pair of synchronous spur gears 326A and 326B of the same shape is provided between the first rotation shaft spur gear 323A and the second rotation shaft spur gear 323B. That is, the first rotation shaft spur gear 323A is engaged with the first synchronous spur gear 326A, and the second synchronous spur gear 326B that is engaged with the first synchronous spur gear 326A is engaged with the second rotation shaft spur gear 323B. Thus, the rotation of the first rotation shaft spur gear 323A is transmitted to the second rotation shaft spur gear 323B in association.

In a case where the pair of synchronous spur gears 326A and 326B rotates with the same number of rotations, the rotational directions of the first rotation shaft spur gear 323A and the second rotation shaft spur gear 323B are different from each other, but the rotational angles thereof are the same. Thus, the finger rotation shafts 324A and 324B rotate in the different directions with the same number of rotations, and thus, the second finger unit 10B and the third finger unit 10C that are respectively provided to the finger rotation shafts 324A and 324B also rotate in the different directions with the same angle.

In this regard, the pitches of the rotation shaft spur gears 323 with respect to the second finger unit 10B and the third finger unit 10C may be formed to be different from each other. Thus, in a case where the first rotation shaft spur gear 323A and the second rotation shaft spur gear 323B rotate with the same number of rotations, the rotational angle where the second finger unit 10B rotates according to the rotation of the first rotation shaft spur gear 323A and the rotational angle where the third finger unit 10C rotates according to the rotation of the second rotation shaft spur gear 323B may be different from each other. According to this configuration, it is possible to hold a special shape such as asymmetry.

In a case where the second finger unit 10B and the third finger unit 10C are turned, the second drive motor 322 is first operated in the turning movement section 30B of the drive section 30, and then, the pulley 327 that is connected to the second drive motor 322 by a belt or the like rotates around the rotation axis C4. Then, the worm gear 321 that is provided coaxially with the pulley 327 rotates around the rotation axis C4, and this rotation is transmitted to the worm wheel 328 that rotates around the rotation axis C5 that is parallel to the hand axis O. Further, the rotation is sequentially transmitted to the first transmission spur gear 325A that is provided coaxially with the worm wheel 328, the second transmission spur gear 325B and the third transmission spur gear 325C, and thus, the first rotation shaft spur gear 323A that is engaged with the third transmission spur gear 325C rotates.

Further, the rotation of the first rotation shaft spur gear 323A is transmitted to the second rotation shaft spur gear 323B through the pair of synchronous spur gears 326A and 326B. At this time, in a case where the first rotation shaft spur gear 323A rotates to the right (in an arrow F1 direction) in a top view of FIG. 7, the second rotation shaft spur gear 323B rotates to the left (in an arrow F2 direction). That is, the first rotation shaft spur gear 323A and the second rotation shaft spur gear 323B rotate in the different directions. Further, the finger rotation shafts 324A and 324B that are provided coaxially with the first rotation shaft spur gear 323A and the second rotation shaft spur gear 323B also respectively rotate to the right (in the arrow F1 direction) and to the left (in the arrow F2 direction) in association with the rotation shaft spur gears. Further, the second finger unit 10B and the third finger unit 10C are turned together with the finger rotation shafts 324A and 324B.

Next, an operation of the opening and closing mechanism 30A will be described.

As shown in FIG. 5, the first drive motor 314 and the pulley 313 are connected to each other by a belt or the like. If the pulley 313 rotates by driving of the first drive motor 314, the screw shaft 311 of the ball screw that extends along the hand axis O and that is provided coaxially with the pulley 313 rotates, and thus, the ball nut 312 moves up and down along the screw shaft 311. At the same time, the lower connection base plate 22 that is provided integrally with the ball nut 312 also relatively moves up and down with respect to the screw shaft 311. Further, since the finger units 10A, 10B and 10C are supported on the lower connection base plate 22, the finger units 10A, 10B and 10C perform the opening and closing operation in association through the connection link 24 according to the up and down movement of the lower connection base plate 22. That is, the finger units 10A, 10B and 10C are respectively configured so that the base end portion of the support member 13 is attached to the lower connection base plate 22 through the connection link 24. Thus, if the connection link 24 moves up and down, the respective finger units 10A, 10B and 10C integrally rotate around the joint section 24a. For example, if the connection link 24 moves down, the finger units 10A, 10B and 10C synchronously move in a direction of being close to the hand axis O. Further, if the connection link 24 moves up, the finger units 10A, 10B and 10C synchronously move in a direction of being distant from the hand axis O.

Next, an operation of the above-mentioned robot hand 100 will be described in detail.

As shown in FIGS. 1 to 5, in the robot hand 100 of the present embodiment, it is possible to circumferentially turn each of two finger units 10B and 10C capable of being turned, approximately around the hand axis O, in a large circumferential range of 180° or greater according to the shape of an object, and thus, it is possible to approximately change an object holding direction of the respective fingers 10A, 10B and 10C. For example, since it is possible to move three finger units 10A, 10B and 10C into aligned finger positions by the turning movement section 30B, by installing the robot hand 100 to each of two arms, it is possible to perform a holding operation of an object such as a rectangular parallelepiped at a stable posture with the object being interposed between the hands (both hands) of two arms.

Further, for example, in a case where the object is a spherical body, it is possible to perform a change so that the respective finger units 10A, 10B and 10C surround the object (so that the respective finger units 10A, 10B and 10C are uniformly arranged around the object). On the other hand, in a case where the object is a rod-shaped member, it is possible to perform a change so that the object is interposed between the respective finger units 10A, 10B and 10C (so that the respective finger units 10A, 10B and 10C face each other through the object). In this way, by changing the direction of the opening and closing operation of the finger units 10A, 10B and 10C, it is possible to stably hold the spherical body or the rod-shaped member.

In this way, it is possible to realize a holding state that is hardly obtained in the related art, to thereby realize various holding states.

Further, according to the robot hand 100 of the present embodiment, the power section that transmits the rotational power to the finger rotation shafts 324A and 324B may be disposed in a space under the support section 20 that does not interfere with the turning finger units. Thus, compared with a case where the power section is disposed in a limited space of the root position (base end position) in the finger units 10A, 10B and 10C, it is possible to install a drive motor of a large output to the robot hand 100, and to secure a large turning range of 180° of the second finger unit 10B and the third finger unit 10C that move in the circumferential direction.

Further, the power section of the turning movement section 30B having a large weight may be disposed at a position that is near the root of the entire robot hand 100, and accordingly, it is possible to position the weight balance and center of gravity of the robot hand 100 in the root portion. Thus, it is possible to reduce the moment that acts on the robot hand 100. Thus, control of a manipulator becomes easy, and stability of the control is increased, and thus, it is possible to enhance holding accuracy in the robot hand 100.

Further, according to the robot hand 100 of the present embodiment, the transmission structure that two rotation shaft spur gears 323A and 323B rotate in the synchronized state by one worm wheel 328 is employed, and accordingly, it is possible to change the finger positions of the two finger units 10B and 10C. For example, in the case of the related art in which two worm wheels are used and rotational power is transmitted to a finger unit corresponding to each worm wheel, it is necessary to position two worm gears with high accuracy in consideration of engagement of the worm gears in manufacturing the robot hand. However, in the robot hand 100 of the present embodiment, since one worm wheel 328 is used, it is not necessary to perform the positioning with high accuracy in manufacturing the robot hand, to thereby shorten a manufacturing time. Further, it is possible to reduce malfunction.

Further, since one worm wheel 328 is provided to be engaged with the worm gear 321 and the other transmission parts are provided as the spur gears (rotation shaft spur gears 323 and the transmission spur gears 325), it is possible to reduce a play amount due to the worm wheel 328 and to reduce rattling of the turning movement section 30B. Thus, it is possible to stably hold an object with higher accuracy.

Further, since two rotation shaft spur gears 323A and 323B rotate at the same angle with the same number of rotations, two finger units 10B and 10C that are connected to the rotation shaft spur gears 323A and 323B similarly rotate at the same angle with the same number of rotations. Thus, a posture control of the object becomes easy.

Further, it is possible to simplify a device configuration, compared with a case where the rotational angles among the plural rotation shaft spur gears are different from one another when the rotation shaft spur gears rotate with the same number of rotations.

Further, even though both the rotation shaft spur gears 323A and 323B are not directly engaged with each other but are disposed to be spaced apart from each other, it is possible to transmit rotation to the second rotation shaft spur gear 323B from the first rotation shaft spur gear 323A by the synchronous spur gears 326A and 326B. Thus, there is an advantage that restrictions on arrangement of the finger rotation shafts 324A and 324B that turn the finger units 10B and 10C are reduced.

Furthermore, as the second finger unit 10B and the third finger unit 10C circumferentially rotate in the direction of being close to or distant from each other, it is possible to stably hold an object at a predetermined position by three finger units 10A, 10B and 10C. In this case, when the second finger unit 10B and the third finger unit 10C that are disposed at the first finger position P1 rotate with the same number of rotations, the rotational angle at which the second finger unit 10B rotates and the rotational angle at which the third finger unit 10C rotates are equal to each other, and thus, the circumferential positions of the second finger unit 10B and the third finger unit 10C with respect to the first finger unit 10A are at the same distance. Thus, it is possible to more stably hold the object.

Next, a method of manufacturing the finger units 10A, 10B and 10C of the robot hand 100 having the above-described configuration will be described.

FIGS. 10 to 21 are process diagrams illustrating a manufacturing process of the finger units 10A, 10B and 10C.

Figure 10:
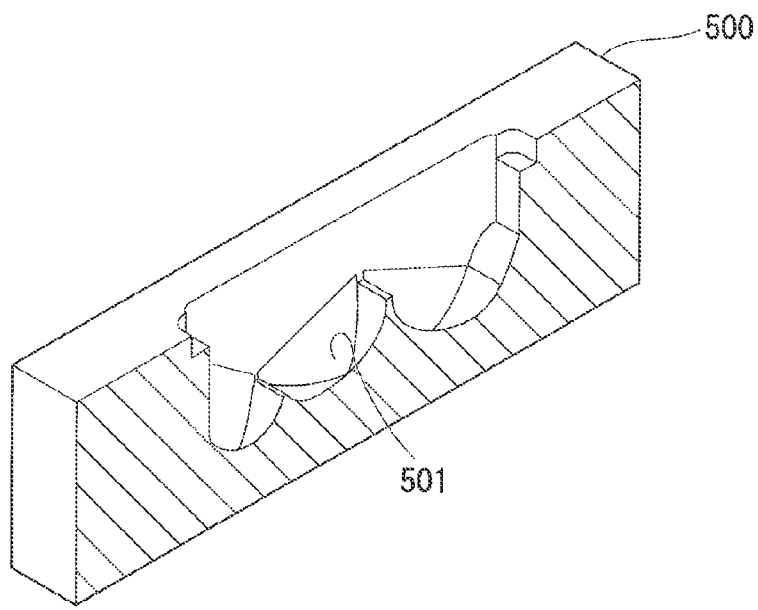
FIG. 10 is a perspective view illustrating a manufacturing process of the finger unit of the robot hand according to the first embodiment.

First, as shown in FIG. 10, a mold 500 for molding the finger units 10A, 10B and 10C is prepared. The mold 500 is formed of wax or the like, for example. The mold 500 is formed with a groove section 501 corresponding to the shape of the finger units 10A, 10B and 10C.

Figure 11:
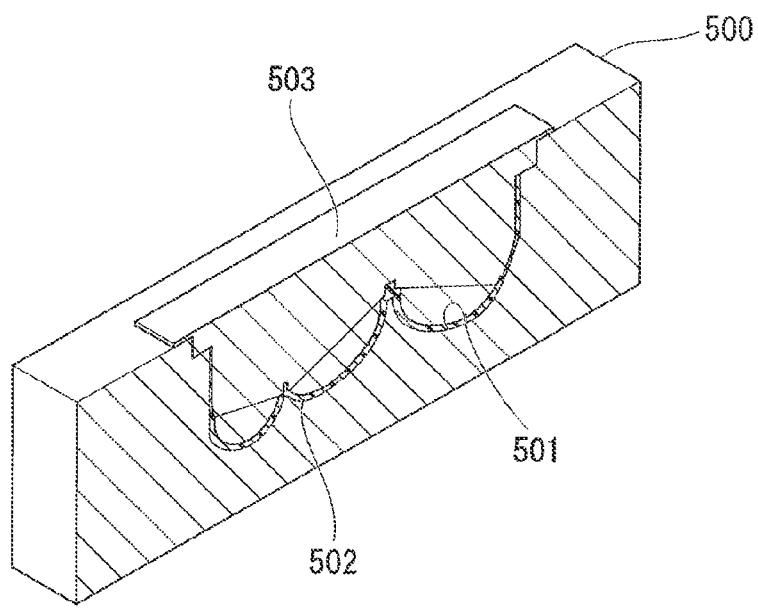
FIG. 11 is a perspective view illustrating the manufacturing process of the finger unit of the robot hand according to the first embodiment.

Then, as shown in FIG. 11, a soft resin 502 flows into the groove section 501, and then, an upper mold 503 is inserted into the groove section 501 so that the soft resin 502 covers the entire surface of the groove section 501 in a film shape. The upper mold 503 is prepared in advance so that a gap in which the soft resin 502 is disposed is formed between the upper mold 503 and the surface of the groove section 501 in a state where the upper mold 503 is inserted in the groove section 501.

Figure 12:
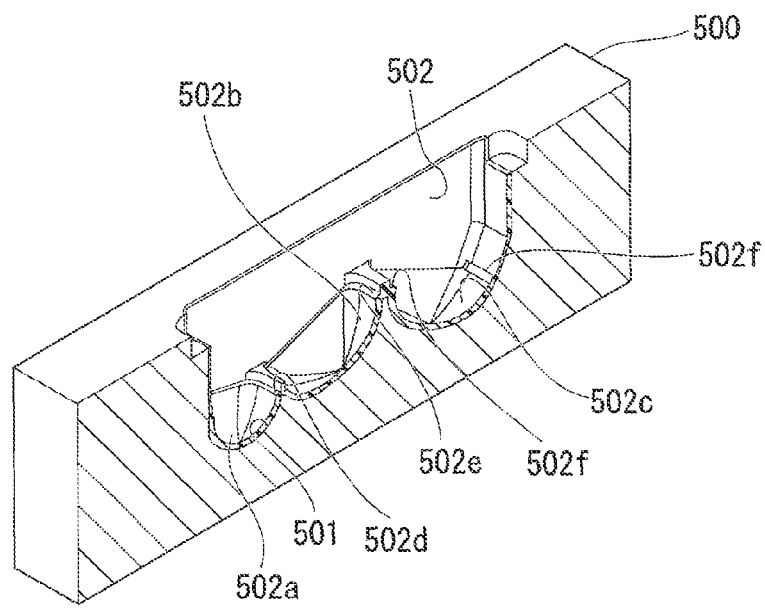
FIG. 12 is a perspective view illustrating the manufacturing process of the finger unit of the robot hand according to the first embodiment.

After the flowed soft resin 502 is solidified, the upper mold 503 is removed as shown in FIG. 12. The soft resin 502 forms a part of the above-mentioned sealing member 50 (the tip portion 51A, the first ball portion 51B, the second ball portion 51C, the side portions 51G and the base end portion 51F), for example. In this way, by forming a part of the sealing member 50 by molding, it is possible to shorten the time compared with cutting, for example, and to reduce the material. Thus, it is possible to reduce the cost, and to enhance yield.

Figure 13:
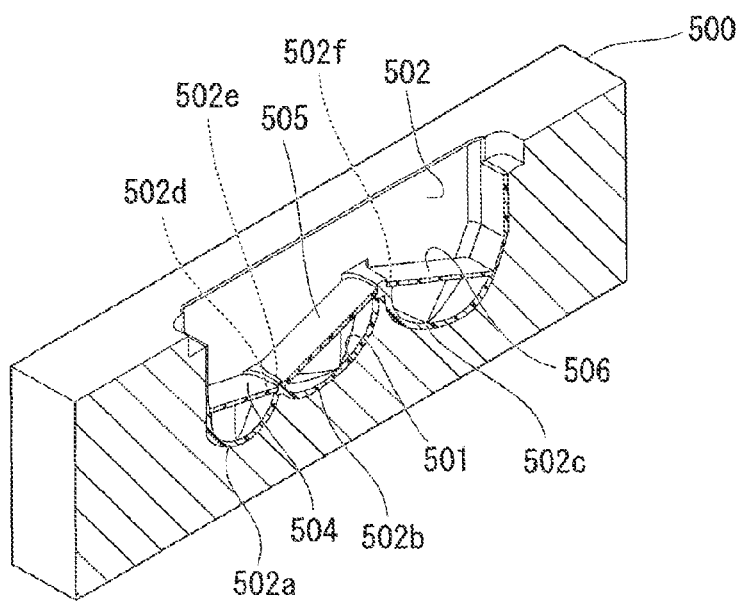
FIG. 13 is a perspective view illustrating the manufacturing process of the finger unit of the robot hand according to the first embodiment.

Then, as shown in FIG. 13, plate-shaped members 504, 505 and 506 formed of an epoxy resin are attached to the solidified soft resin 502. The plate-shaped members 504, 505 and 506 form a part of the above-mentioned rigid member 11 (the tip portion 11A, the first ball portion 11B and the second ball portion 11C). In this process, the plate-shaped members 504, 505 and 506 are attached to the resin 502 so that space between three curved portions 502a, 502b and 502c of the soft resin 502 that form the tip portion 51A, the first ball portion 51B and the second ball portion 51C and the plate-shaped members 504, 505 and 506 are sealed.

Further, in this process, for example, as shown in FIGS. 12 and 13, step portions 502d, 502e and 502f are respectively formed in advance in the curved portions 502a, 502b and 502c, and the plate-shaped members 504, 505 and 506 are disposed to hang on the step portions 502d, 502e and 502f. Accordingly, it is possible to prevent shift of the attachment positions of the plate-shaped members 504, 505 and 506.

Figure 14:
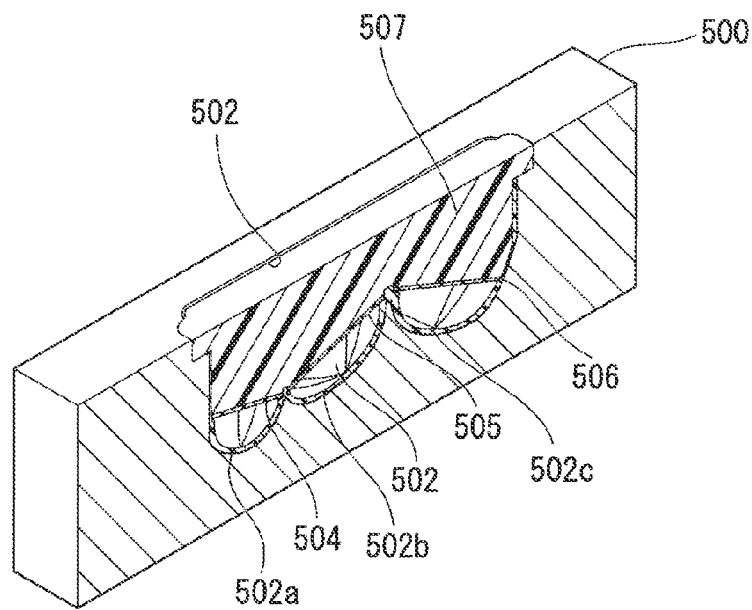
FIG. 14 is a perspective view illustrating the manufacturing process of the finger unit of the robot hand according to the first embodiment.

Then, as shown in FIG. 14, a hard resin 507 such as an epoxy resin flows into a portion surrounded by the soft resin 502 and three plate-shaped members 504, 505 and 506, and is then cured. At this time, since the plate-shaped members 504, 505 and 506 seal the space between the plate-shaped members 504, 505 and 506 and three curved portions 502a, 502b and 502c, the hard resin 507 does not flow into the space. According to this process, the plate-shaped members 504, 505 and 506 and the hard resin 507 are integrally formed.

Figure 15:
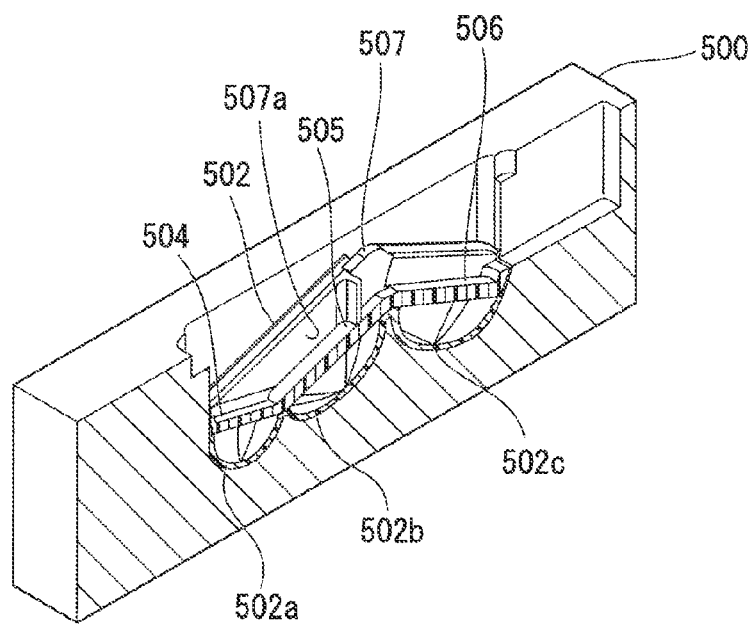
FIG. 15 is a perspective view illustrating the manufacturing process of the finger unit of the robot hand according to the first embodiment.

Then, as shown in FIG. 15, the solidified hard resin 507 is cut. In this process, a wall portion 507a that forms the side portion 11G of the rigid member 11 is formed, and an opening portion 507b that forms the through hole 11b is formed. Further, a part of the soft resin 502 is removed to become suitable for the cutting of the hard resin 507.

Figure 16:
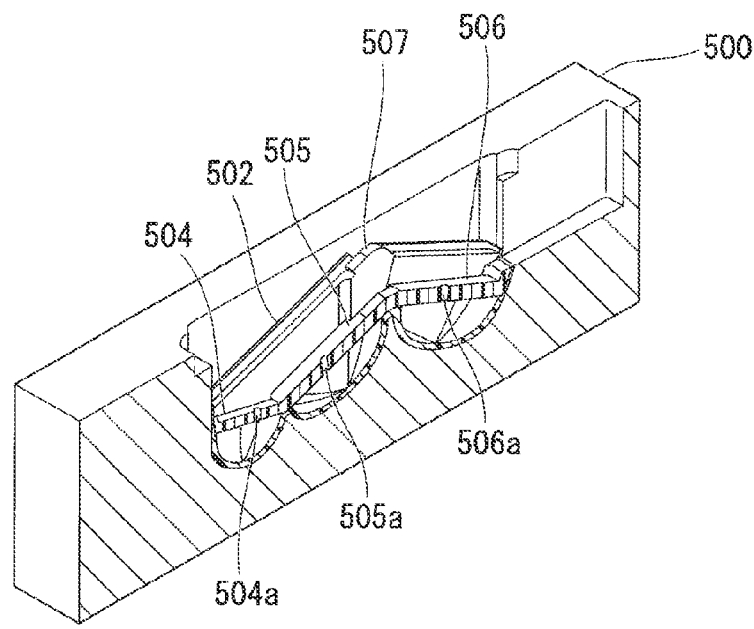
FIG. 16 is a perspective view illustrating the manufacturing process of the finger unit of the robot hand according to the first embodiment.

Then, as shown in FIG. 16, through holes 504a, 505a and 506a for arrangement of the first pressure sensor 71, the second pressure sensor 72 and the third pressure sensor 73 are formed in the plate-shaped members 504, 505 and 506. In this process, the through holes 504a, 505a and 506a are formed using a drill or the like, for example. The space between the plate-shaped members 504, 505 and 506 and the curved portions 502a, 502b and 502c communicates with the outside through the through holes 504a, 505a and 506a. The pressure sensing portion 71b of the first pressure sensor 71, the pressure sensing portion 72b of the second pressure sensor 72 and the pressure sensing portion 73b of the third pressure sensor 73 are respectively disposed in the through holes 504a, 505a and 506a.

Figure 17:
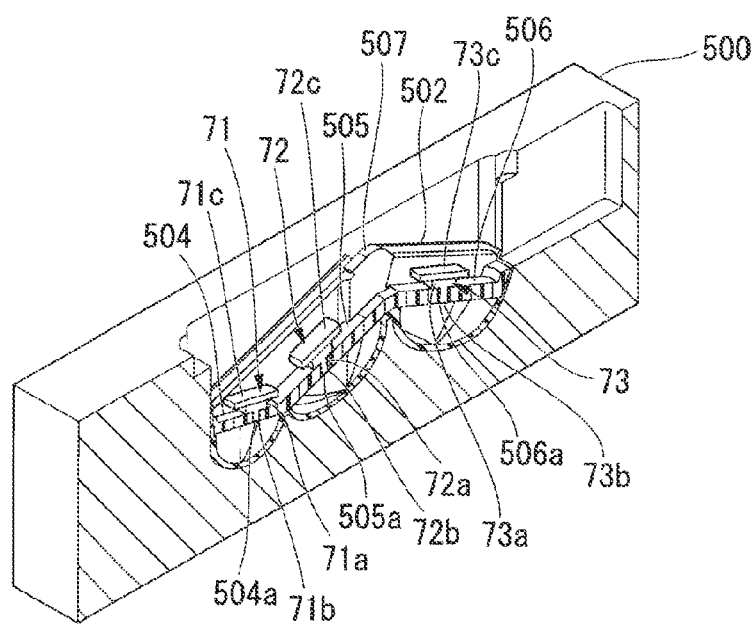
FIG. 17 is a perspective view illustrating the manufacturing process of the finger unit of the robot hand according to the first embodiment.

Then, as shown in FIG. 17, the first pressure sensor 71, the second pressure sensor 72 and the third pressure sensor 73 are mounted on the plate-shaped members 504, 505 and 506. When the first pressure sensor 71 is mounted, the main body portion 71a is adhered to the plate-shaped member 504 so that the pressure sensing portion 71b is inserted into the through hole 504a. Further, when the second pressure sensor 72 is mounted, the main body portion 72a is adhered to the plate-shaped member 505 so that the pressure sensing portion 72b is inserted into the through hole 505a. Further, when the third pressure sensor 73 is mounted, the main body portion 73a is adhered to the plate-shaped member 506 so that the pressure sensing portion 73b is inserted into the through hole 506a. For example, an adhesive agent of an epoxy resin system or the like may be used for adhesion of the main body portions 71a, 72a and 73a.

Figure 18:
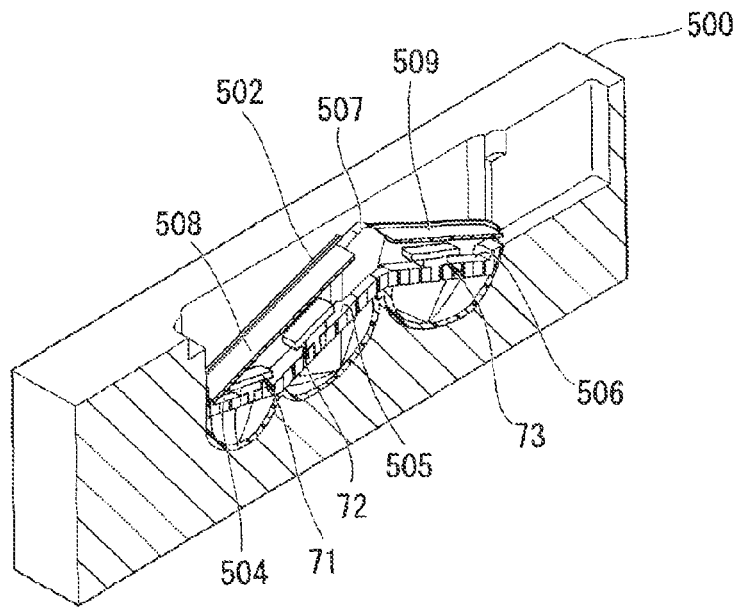
FIG. 18 is a perspective view illustrating the manufacturing process of the finger unit of the robot hand according to the first embodiment.

Then, as shown in FIG. 18, plate-shaped members 508 and 509 formed of an epoxy resin are adhered to an upper portion of the hard resin 507. The plate-shaped members 508 and 509 form a part (the first back portion 11D and the second back portion 11E) of the above-mentioned rigid member 11. In this process, the plate-shaped member 508 is disposed so as to cover the first pressure sensor 71 and the second pressure sensor 72, and the plate-shaped member 509 is disposed so as to cover the third pressure sensor 73.

Figure 19:
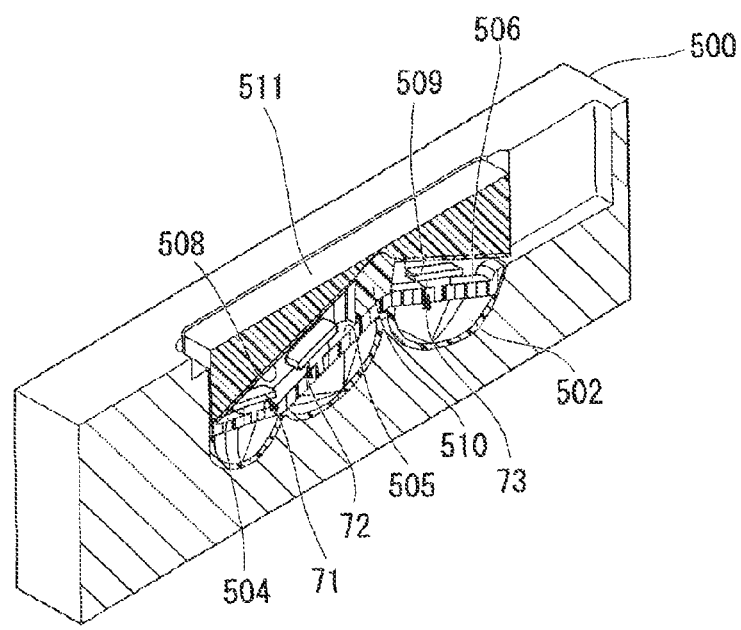
FIG. 19 is a perspective view illustrating the manufacturing process of the finger unit of the robot hand according to the first embodiment.

Then, as shown in FIG. 19, a viscous oil 510 is disposed so as to seal a space between the plate-shaped member 508 and the plate-shaped member 509. In this state, a soft resin 511 flows in so as to cover the plate-shaped members 508 and 509 and the viscous oil 510. For example, the soft resin 511 may be formed of the same material as the soft resin 502, or may be formed of a different material. Since the space between the plate-shaped member 508 and the plate-shaped member 509 is sealed by the viscous oil 510, the soft resin 502 does not flow into the space in which the first pressure sensor 71, the second pressure sensor 72 and the third pressure sensor 73 are disposed. According to this process, the soft resin 502 and the soft resin 511 are integrally formed.

Figure 20:
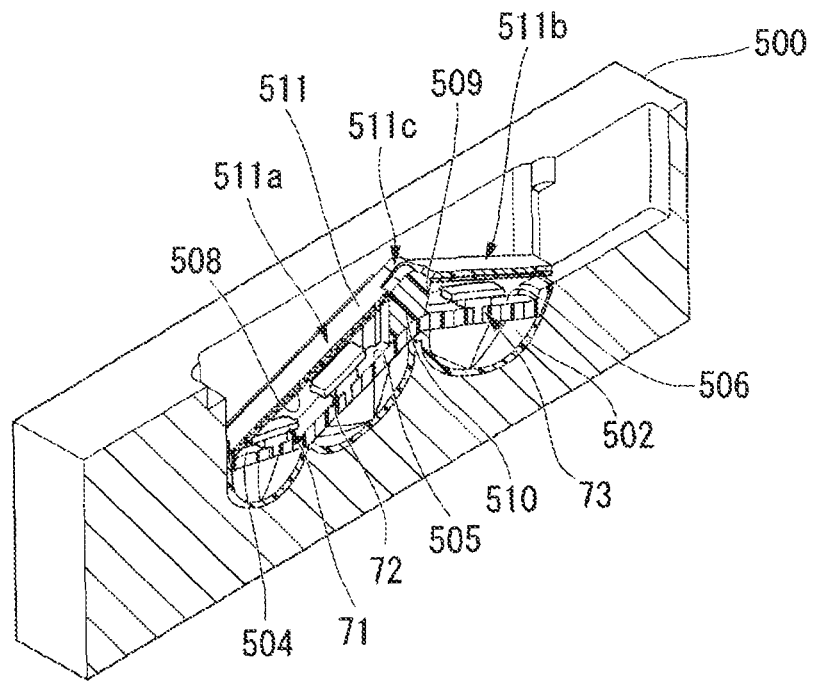
FIG. 20 is a perspective view illustrating the manufacturing process of the finger unit of the robot hand according to the first embodiment.

Then, as shown in FIG. 20, after the flowed soft resin 511 is solidified, the soft resin 511 is cut. In this process, coating portions 511a and 511b of a predetermined thickness that cover the plate-shaped members 508 and 509 and a coating portion 511c that covers an upper side of the hard resin 507 are formed, and the soft resin 511 is cut so that the viscous oil 510 is exposed. The coating portions 511a, 511b and 511c form a part (the first back portion 51D, the second back portion 51E and the connection portion 51H) of the sealing member 50.

Figure 21:
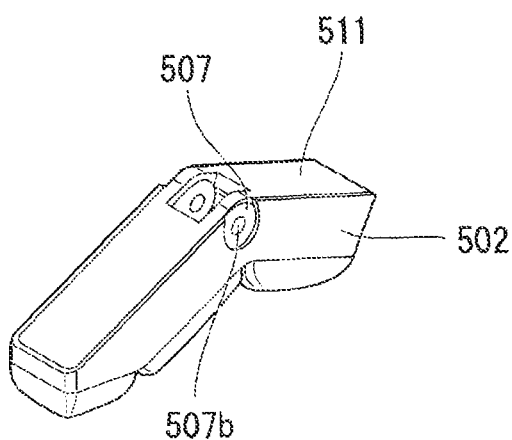
FIG. 21 is a perspective view illustrating the manufacturing process of the finger unit of the robot hand according to the first embodiment.

Then, as shown in FIG. 21, the viscous oil 510 is removed from an opening portion of the soft resin 511, and a portion covered with the soft resins 502 and 511 that are integrally formed is extracted from the mold 500. Then, a through hole 507b is formed in a portion of the hard resin 507 that is exposed from the soft resins 502 and 511. The through hole 507b forms the above-mentioned through hole 11b of the rigid member 11. Then, the wirings of the first pressure sensor 71, the second pressure sensor 72 and the third pressure sensor 73 are extracted, and then, the first pressure sensor 71, the second pressure sensor 72 and the third pressure sensor 73 are sealed. Consequently, the chamber portion 11H is sealed.

Through the above processes, the finger units 10A, 10B and 10C having a configuration in which the plural portions that include the plate-shaped members 504, 505, 506, 508 and 509 and the hard resin 507 are formed as a single member (the rigid member 11) and the rigid member 11 that is formed as the single member is covered with the soft resins 502 and 511 (the sealing member 50) are manufactured.

In the robot hand and the robot device described above according to the present embodiment, it is possible to hold various objects having various shapes or sizes in various holding postures, in a simple manner and at low cost.

As described above, according to the present embodiment, since the finger units 10A, 10B and 10C are configured to include the rigid member 11 in which the tip portion 10a and the portions other than the tip portion 10a form a single member, and the sealing member 50 that covers the front surface of the rigid member 11, it is possible to simplify the structure of the finger units 10A, 10B and 10C, and to reduce the number of components of the finger units 10A, 10B and 10C. In addition, since the integral molding may be performed using the same material by a technique such as injection molding, for example, it is possible to reduce the cost. Thus, it is possible to provide a robot hand that is capable of being manufactured with a small number of components at low cost.

Further, according to the present embodiment, since the rigid member 11 includes a retaining portion (the tip portion 11A, the first ball portion 11B and the second ball portion 11C) that retains the first pressure sensor 71, the second pressure sensor 72 and the third pressure sensor 73 and the first pressure sensor 71, the second pressure sensor 72 and the third pressure sensor 73 are disposed in the chamber portion 11H that is sealed by the sealing member 50, it is possible to prevent inflow of water from the outside, to thereby suppress water from being in contact with the first pressure sensor 71, the second pressure sensor 72 and the third pressure sensor 73. Thus, it is possible to provide a robot hand that is capable of performing an operation in an environment having a large amount of moisture.

Second Embodiment

Hereinafter, a robot hand and a robot device according to another embodiment of the invention will be described referring to the accompanying drawings. Here, the same reference numerals are given to the same or like members and parts as in the above-described first embodiment, and description thereof will be omitted. A configuration that is different from the first embodiment will be described.

Figure 22:
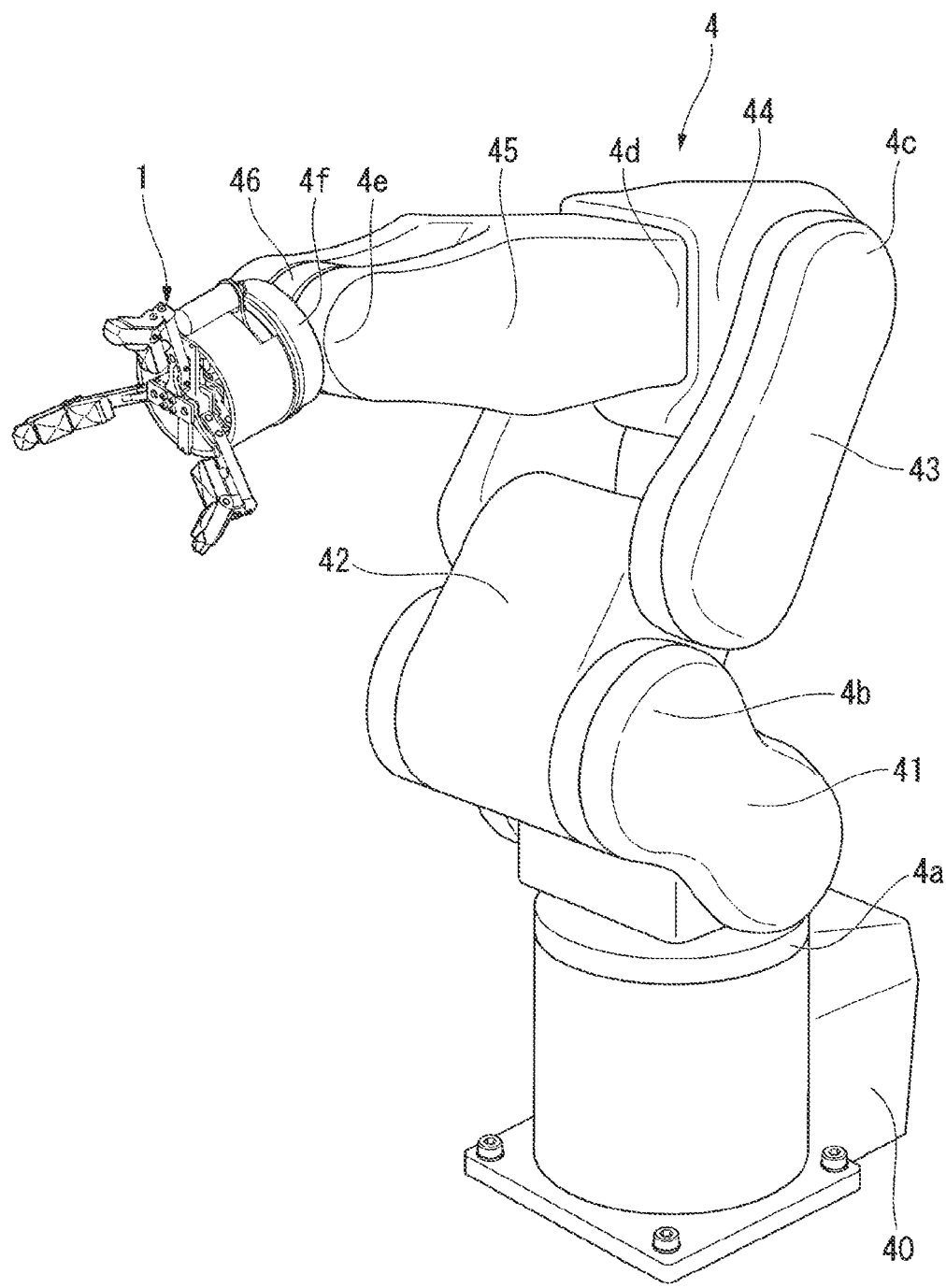
FIG. 22 is a perspective view illustrating an entire configuration of a robot device according to a second embodiment of the invention.

As shown in FIG. 22, a robot device 4 is used as an industrial robot arm, for example. The robot device 4 is provided to a multi-axial arm that includes a mounting section 40, a first link 41, a second link 42, a third link 43, a fourth link 44, a fifth link 45 and a sixth link 46.

The mounting section 40 is mounted on a floor, a wall, a ceiling or the like, for example. The first link 41 to the sixth link 46 are serially connected in the order from the mounting section 40. Further, in the robot device 4 of the present embodiment, the mounting section 40, the first link 41, and the other links are connected to each other to be rotatable at connection portions (joints 4a, 4b, 4c, 4d, 4e and 4f). Since the respective links of the first link 41 to the sixth link 46 are provided to be rotatable, as the respective links appropriately rotate at the joints 4a to 4f, it is possible to perform a complex operation in the entire robot arm.

The sixth link 46 corresponds to a tip part of the robot device 4. The robot hand 100 according to the above-described first embodiment is mounted to the tip part of the sixth link 46.

According to the robot device 4 of the second embodiment, it is possible to provide a robot device that is capable of holding various objects having various shapes or sizes, in a simple manner and at low cost.

In the second embodiment, an example of the robot device having six joints is illustrated, but the number of joints is not limited thereto and may be one or more. A robot device may be provided that includes seven or more joints and has a wide range of arm operation.

Third Embodiment

Figure 23:
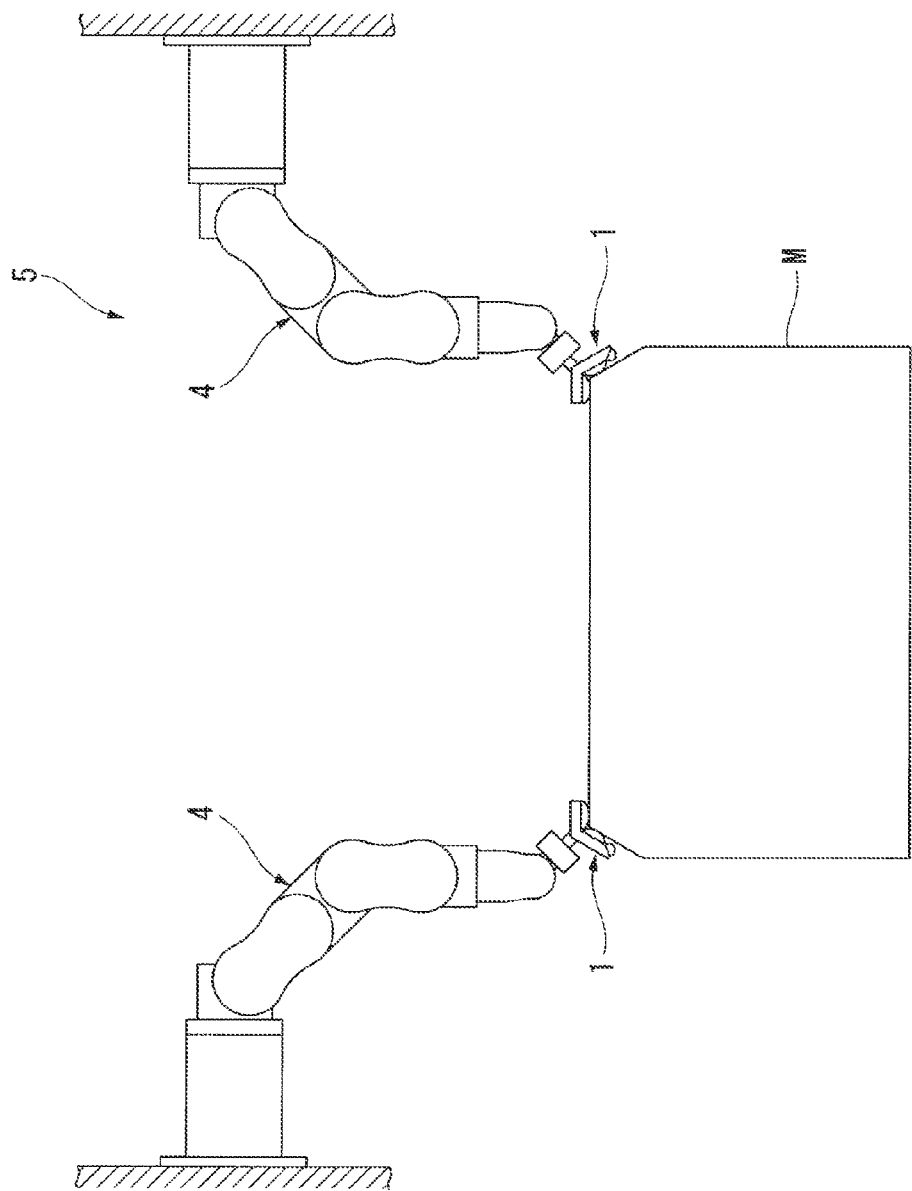
FIG. 23 is a perspective view illustrating an entire configuration of a robot device according to a third embodiment of the invention.

As shown in FIG. 23, a robot device 5 according to a third embodiment is a dual arm robot that is provided with plural (here, two) multi-axial arms (robot devices 4) according to the above-described second embodiment. In this case, the robot hand 100 is provided to each of two arms, and thus, it is possible to perform a holding operation of an object Musing the hands of two arms with the object M being interposed therebetween. In this way, it is possible to realize a holding state that is barely achieved in the related art, and to realize various holding states.

Figure 24:
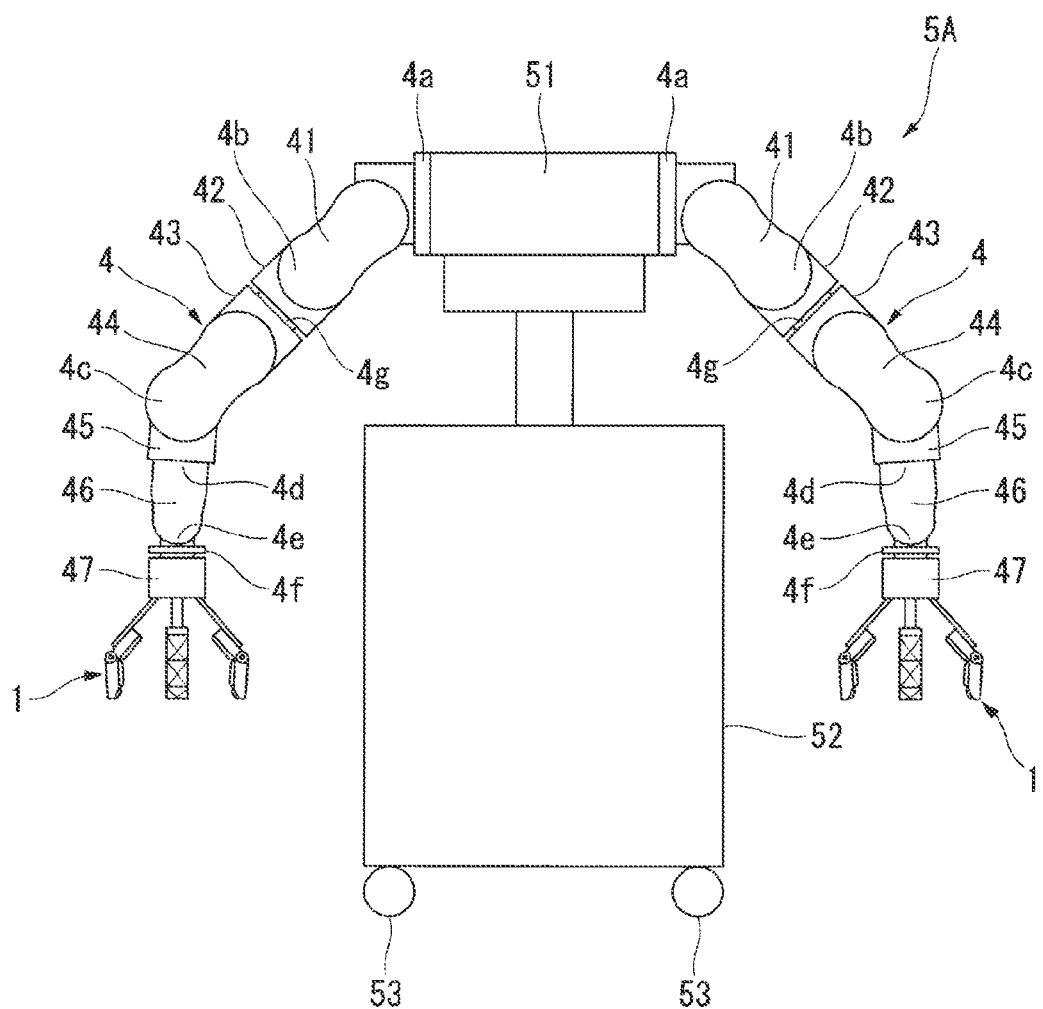
FIG. 24 is a perspective view illustrating an entire configuration of a robot device according to a modification example of the invention.

Further, as shown in a modification example in FIG. 24, a configuration may be provided in which the robot hand 100 is provided to each of two multi-axial arms (robot devices 4) that is provided to a body section 51 of a robot device 5A. Further, if each multi-axial arm 4 is provided as a seven-axis arm having a first link 41 to a seven link 47 and the robot hand 100 is provided to each multi-axial arm 4, it is possible to realize the same arm operation and holding state as when a human holds a large object using two arms and hands. The robot device 5A of the present embodiment has a configuration of the seven-axis arm as a rotation shaft 4g is provided between joints of reference numerals 4b and 4c among sixth connection portions (joints 4a, 4b, 4c, 4d, 4e and 4f).

In FIG. 24, the robot device 5A is configured so that wheels 53 are provided at a bottom portion thereof and the body section 51 is supported on a main body section 52 that accommodates a control device (not shown), and is movable by the wheels 53.

In this way, according to the third embodiment shown in FIGS. 23 and 24, it is possible to hold a large object that is barely held by one arm (robot hand 100). Further, in the case of holding an object inside a box by two arms (robot devices 4) with the finger units being put into a space between the box and the object, according to a three-finger hand in the related art, it is difficult to put all the finger units into the space in a case where the space is narrow. However, according to the third embodiment, it is possible to put the finger units into the space by aligning the finger tips, and thus, it is possible to firmly hold the object by a larger number of finger units compared with the hand in the related art.

Hereinbefore, the robot hand and the robot device according to the embodiments of the invention are described, but the invention is not limited to the above embodiments, and may include various modifications appropriately made in a range without departing from the spirit thereof.

For example, in the above-described embodiments, three finger units 10A, 10B and 10C are provided, but the number of finger units is not limited to three. That is, it may be enough that three or more finger units are provided, and at least two finger units thereof are provided to be able to turn.

Further, the components of the above-described embodiments may be appropriately replaced with known components in a range without departing from the spirit of the invention.

The entire disclosure of Japanese Patent Application No. 2012-226109, filed Oct. 11, 2012 is expressly incorporated by reference herein.

What is claimed is:

1. A robot hand comprising:
a finger unit that is in contact with an object,
wherein the finger unit includes:
a first member in which a tip portion and a base portion connected to the tip portion are formed as a single member;
a second member that covers a surface of the first member,
wherein the first member includes a first chamber that accommodates a predetermined functional element relating to a contact operation with the object, and the first chamber is sealed by the first member and the second member, and
wherein a through hole through which a wiring connected to the functional element passes is formed in the base portion, and
the through hole is covered with the second member.

2. The robot hand according to claim 1,
wherein the functional element is a pressure sensor that detects pressure that acts on the finger unit by contact with the object.

3. The robot hand according to claim 1,
wherein the second member is provided to be elastically deformable, and
a second chamber that communicates with the first chamber is provided between the second member and the first member.

4. The robot hand according to claim 1,
wherein the first member has rigidity with respect to at least pressure that acts on the finger unit by contact with the object.

5. The robot hand according to claim 1, further comprising:
a support portion that supports a connection portion that connects the tip portion and the base portion of the finger unit so that the finger unit is rotatable in a predetermined direction; and
an elastic portion that connects the support portion and the base portion and gives an elastic force to the finger unit in a predetermined direction.

6. The robot hand according to claim 1,
wherein a plurality of finger units are provided, and
the plurality of finger units are capable of holding the object.

7. A robot device comprising:
a robot hand having a finger unit that is in contact with an object; and
a multi-axial arm that supports the robot hand,
wherein the finger unit includes:
a first member in which a tip portion and a base portion connected to the tip portion are formed as a single member,
a second member that covers a surface of the first member
wherein the first member includes a first chamber that accommodates a predetermined functional element relating to a contact operation with the object, and the first chamber is sealed by the first member and the second member, and wherein a through hole through which a wiring connected to the functional element passes is formed in the base portion, and the through hole is covered with the second member.

8. The robot device according to claim 7, wherein a plurality of multi-axial arms are provided.

9. A robot device comprising:

a plurality of robot hands;

at least one of the plurality of robot hands includes a finger unit that is in contact with an object, the finger unit including a first member in which a tip portion and a base portion connected to the tip portion are formed as a single member, a second member that covers a surface of the first member, wherein the first member includes a first chamber that accommodates a predetermined functional element relating to a contact operation with the object, and the first chamber is sealed by the first member and the second member; and a plurality of multi-axial arms that support the plurality of robot hands, and wherein a through hole through which a wiring connected to the functional element passes is formed in the base portion, and the through hole is covered with the second member.

10. A method of manufacturing a robot hand, comprising:

molding a surface member that is provided on a surface of a finger unit that is in contact with an object;

arranging a first member inside the surface member so that the first member is covered with the molded surface member and a tip portion of the first member and a base portion thereof connected to the tip portion are formed as a single member; and retaining a predetermined functional element relating to a holding operation of the object in the first member after the first member is arranged inside the surface member, wherein a through hole through which a wiring connected to the functional element passes is formed in the base portion, and the through hole is covered with the surface member.

11. The method according to claim 10, further comprising:

sealing the first member after the functional element is retained.

* * * * *